United States Patent
Dietle et al.

(10) Patent No.: US 6,685,194 B2
(45) Date of Patent: Feb. 3, 2004

(54) HYDRODYNAMIC ROTARY SEAL WITH VARYING SLOPE

(76) Inventors: Lannie Dietle, 14838 Sagamore Hills, Houston, TX (US) 77082; Manmohan S. Kalsi, 13307 Carousel Ct., Houston, TX (US) 77041; Jeffrey D. Gobeli, 1445 Lakeside Estates Dr., Houston, TX (US) 77042

(*) Notice: Subject to any disclaimer, the term of this patent is extended or adjusted under 35 U.S.C. 154(b) by 0 days.

(21) Appl. No.: 09/834,330

(22) Filed: Apr. 12, 2001

(65) Prior Publication Data

US 2001/0020770 A1 Sep. 13, 2001

Related U.S. Application Data

(63) Continuation-in-part of application No. 09/314,349, filed on May 19, 1999, now Pat. No. 6,334,619.
(60) Provisional application No. 60/179,658, filed on Feb. 2, 2000, provisional application No. 60/196,323, filed on Apr. 12, 2000, and provisional application No. 60/202,614, filed on May 9, 2000.

(51) Int. Cl.$^7$ ................................................. F16J 15/32
(52) U.S. Cl. ........................................ 277/559; 277/560
(58) Field of Search ................................ 277/559, 560, 277/572, 573, 574, 584

(56) References Cited

U.S. PATENT DOCUMENTS

| | | |
|---|---|---|
| 2,679,441 A | 5/1954 | Stillwagon |
| 2,934,368 A | 4/1960 | Adamson |
| 3,342,500 A | 9/1967 | Knudson |
| 3,627,337 A | 12/1971 | Pippert |
| 3,901,517 A | 8/1975 | Heathcott |
| 3,929,340 A * | 12/1975 | Peisker ..................... 277/559 |
| 3,942,806 A | 3/1976 | Edlund |
| 4,013,299 A | 3/1977 | Scott |
| 4,053,163 A | 10/1977 | Vegella |
| 4,067,407 A | 1/1978 | Berg |
| 4,094,519 A * | 6/1978 | Heyn et al. ................. 277/559 |
| 4,174,846 A | 11/1979 | Scott |

(List continued on next page.)

FOREIGN PATENT DOCUMENTS

| | | |
|---|---|---|
| CA | 2.145.548 | 2/1995 |
| WO | WO 00/65257 | 11/2000 |
| WO | WO 00/65258 | 11/2000 |
| WO | WO 00/65259 | 11/2000 |

*Primary Examiner*—Anthony Knight
*Assistant Examiner*—Vishal Patel
(74) *Attorney, Agent, or Firm*—James L. Jackson; Andrews Kurth LLP

(57) ABSTRACT

A hydrodynamically lubricating seal has a generally circular seal body defining a static sealing surface and having a dynamic sealing lip projecting from the seal body for establishing sealing relation with a relatively rotatable surface. When compressed against a relatively rotatable surface, dynamic sealing lip defines a hydrodynamic geometry which wedges a film of lubricating fluid into the interface between the seal and the relatively rotatable surface in response to relative rotation. The dynamic sealing lip geometry maintains interfacial contact pressure within the dynamic sealing interface for efficient hydrodynamic lubrication and environmental exclusion, which enhances lubrication and environmental exclusion while permitting relatively high initial compression and relatively low torque.

In abrasive environments, the improved exclusionary action results in a dramatic reduction of seal and shaft wear, compared to prior art, and provides a significant increase in seal life. The invention also increases seal life by making higher levels of initial compression possible, compared to prior art, without compromising hydrodynamic lubrication. This added compression makes the seal more tolerant of compression set, abrasive wear, mechanical misalignment, dynamic runout and manufacturing tolerances.

41 Claims, 8 Drawing Sheets

U.S. PATENT DOCUMENTS

| | | |
|---|---|---|
| 4,193,606 A | 3/1980 | Iverson |
| 4,283,064 A * | 8/1981 | Staab et al. .................. 277/559 |
| 4,288,083 A | 9/1981 | Braconier |
| 4,328,972 A * | 5/1982 | Albertson et al. .......... 264/138 |
| 4,441,722 A | 4/1984 | Pichler |
| 4,484,753 A | 11/1984 | Kalsi |
| 4,610,319 A * | 9/1986 | Kalsi ......................... 175/371 |
| 4,789,166 A | 12/1988 | Rericha et al. |
| 4,917,390 A | 4/1990 | Lee et al. |
| 5,002,289 A | 3/1991 | Yasui et al. |
| 5,190,299 A * | 3/1993 | Johnston .................... 277/559 |
| 5,230,520 A | 7/1993 | Dietle et al. |
| 5,427,387 A | 6/1995 | Johnston |
| 5,482,296 A | 1/1996 | Peppiatt et al. |
| 5,678,829 A | 10/1997 | Kalsi et al. |
| 5,738,358 A | 4/1998 | Kalsi et al. |
| 5,791,658 A * | 8/1998 | Johnston ..................... 277/549 |
| 5,873,576 A | 2/1999 | Dietle et al. |
| 5,921,555 A | 7/1999 | Johnston |
| 6,036,192 A | 3/2000 | Dietle et al. |
| 6,105,968 A | 8/2000 | Yeh et al. |
| 6,109,618 A | 8/2000 | Dietle |
| 6,120,036 A | 9/2000 | Kalsi et al. |
| 6,139,020 A | 10/2000 | Friend et al. |

* cited by examiner

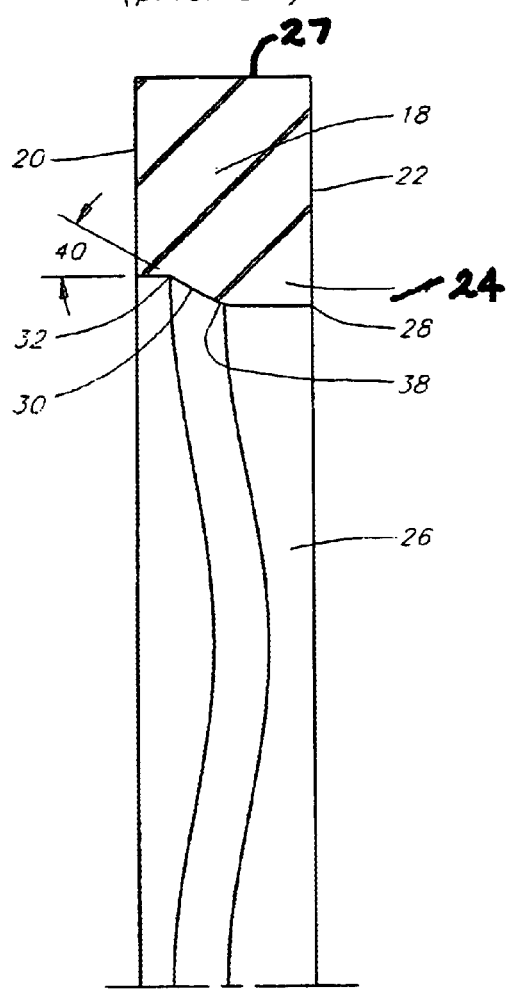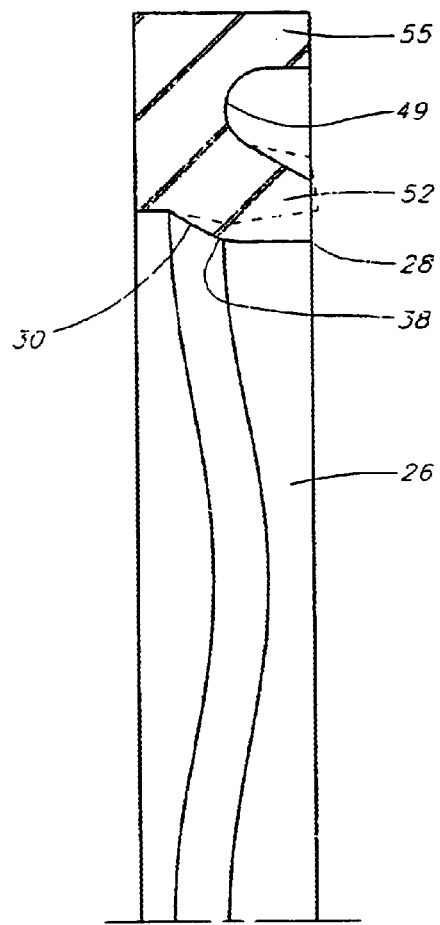

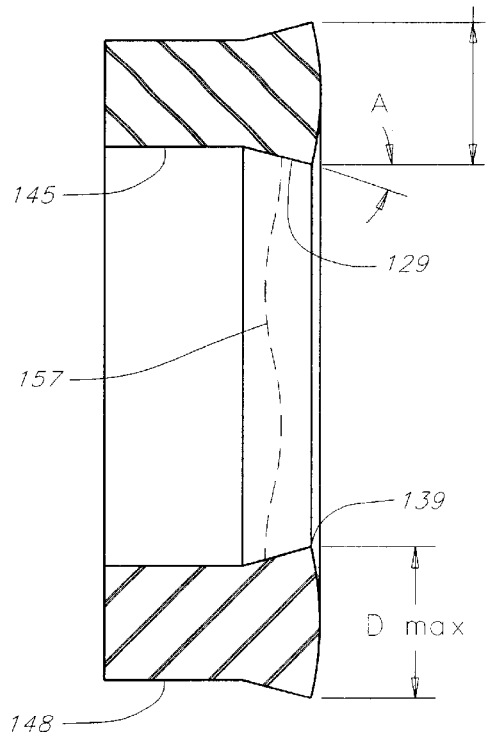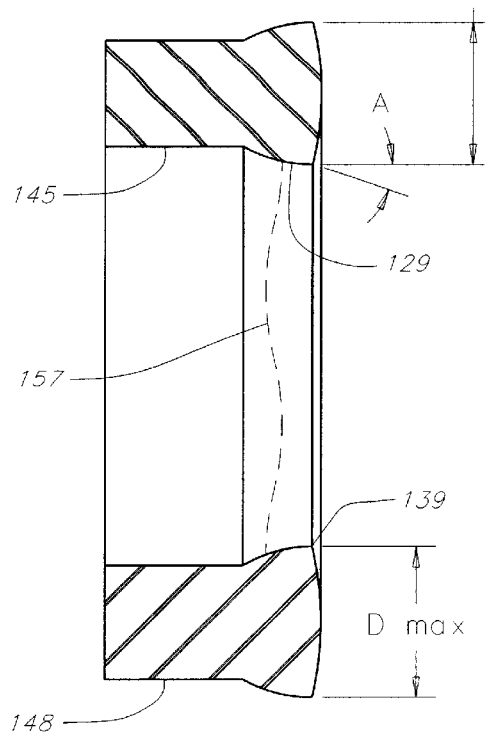

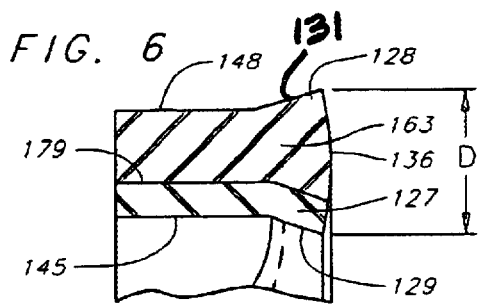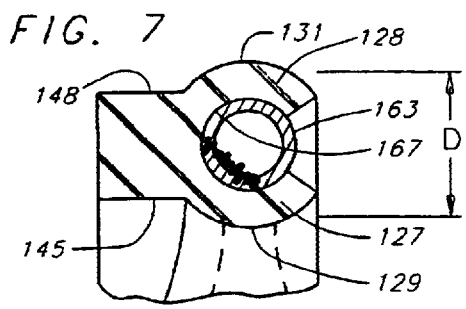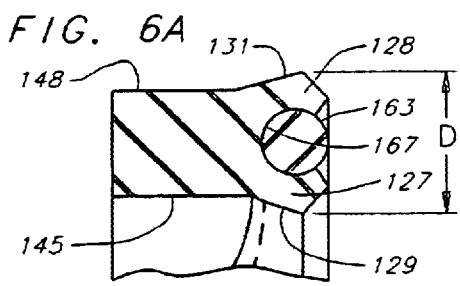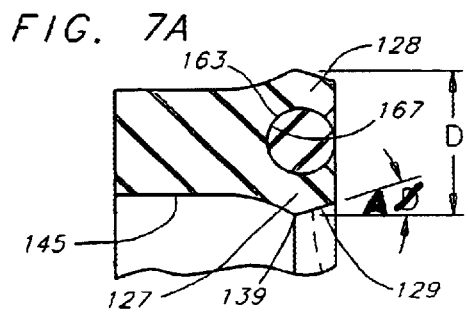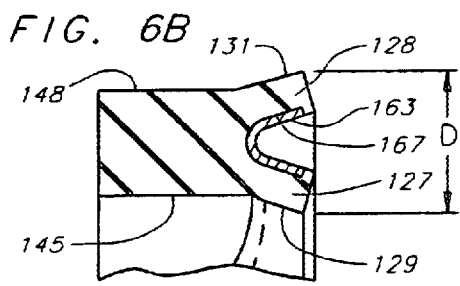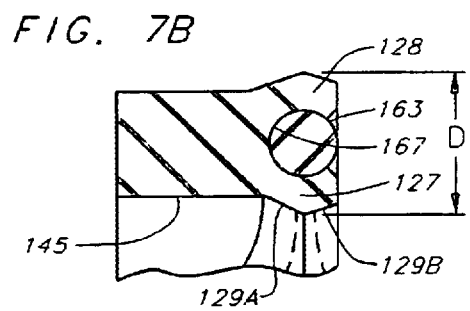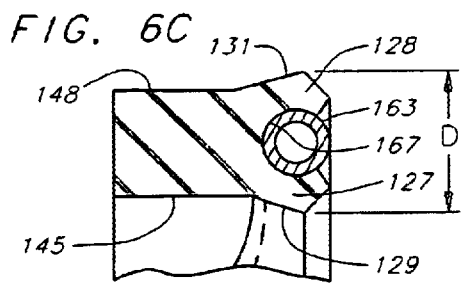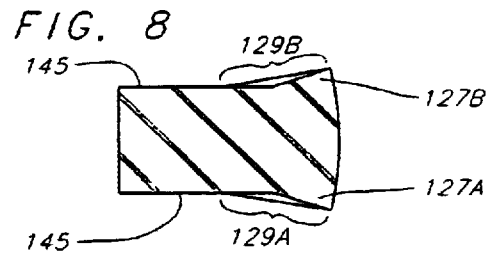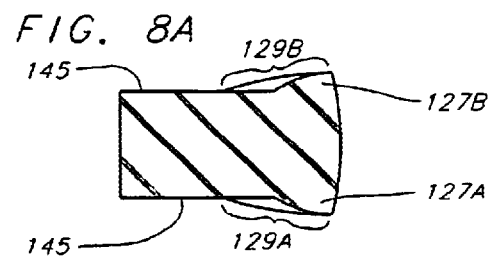

US 6,685,194 B2

HYDRODYNAMIC ROTARY SEAL WITH VARYING SLOPE

This is a continuation-in-part of utility application Ser. No. 09/314,349 filed on May 19, 1999 U.S. Pat. No. 6,334,619 by Lannie Dietle and Manmohan S. Kalsi entitled "Hydrodynamic Packing Assembly," and utility application Ser. No. 60/179,658 filed on Feb. 2, 2000 by Lannie Dietle, William Conroy and John Schroeder entitled "Hydrodynamic Rotary Coupling Seal." Applicants hereby claim the benefit of U.S. Provisional Application Ser. No. 60/196,323 filed on Apr. 12, 2000 by Lannie L. Dietle and entitled "Hydrodynamic Rotary Seal," and Ser. No. 60/202,614 filed on May 9, 2000 by Lannie L. Dietle entitled "Hydrodynamic Seal," which provisional applications are incorporated herein by reference for all purposes.

BACKGROUND OF THE INVENTION

The present invention relates generally to seals that interact with lubricant during rotation of a relatively rotatable surface to wedge a film of lubricant into the interface between the seal and the relatively rotatable surface to reduce wear. More specifically, the present invention concerns the provision of a unique dynamic sealing lip geometry in a hydrodynamic seal that enhances lubrication and environmental exclusion of the seal and controls interfacial contact pressure within the dynamic sealing interface for efficient hydrodynamic lubrication and environmental exclusion while permitting relatively high initial compression and relatively low torque.

FIG. 1 of this specification represents a commercial embodiment of the prior art of U.S. Pat. No. 4,610,319, and FIG. 1A represents a commercial embodiment of the prior art of U.S. Pat. No. 5,678,829. These figures are discussed herein to enhance the readers' understanding of the distinction between prior art hydrodynamic seals and the present invention. The lubrication and exclusion principles of FIG. 1 are also used in the prior art seals of U.S. Pat. Nos. 5,230,520, 5,738,358, 5,873,576, 6,036,192, 6,109,618 and 6,120,036, which are commonly assigned herewith. The aforementioned patents pertain to various seal products of Kalsi Engineering, Inc. of Sugar Land, Tex. that are known in the industry by the registered trademark "Kalsi Seals", and are employed in diverse rotary applications to provide lubricant retention and contaminant exclusion in harsh environments.

Referring now to FIG. 1, the seal incorporates a seal body 18 that is solid and generally ring-like, and defines a lubricant end 20 and an environment end 22. The seal incorporates a dynamic sealing lip 24 defining a dynamic sealing surface 26 and also defining a circular exclusionary geometry 28 which may be abrupt, and which is for providing environmental exclusion.

The dynamic sealing lip 24 has an angulated flank 30 having intersection with the seal body at lip termination point 32. Angulated flank 30 is non-circular, and forms a wave pattern about the circumference of the seal, causing dynamic sealing surface 26 to vary in width.

Hydrodynamic inlet radius 38 is a longitudinally oriented radius that is the same size everywhere around the circumference of the seal, and is tangent to dynamic sealing surface 26 and angulated flank 30. Since hydrodynamic inlet radius 38 is tangent to angulated flank 30, it also varies in position about the circumference of the seal in a wavy manner. Angulated flank 30 defines a flank angle 40 that remains constant about the circumference of the seal.

When installed, the seal is located within a housing groove and compressed against a relatively rotatable surface to establish sealing contact therewith, and is used to retain a lubricant and to exclude an environment. When relative rotation occurs, the seal remains in stationary sealing contact with the housing groove, while the interface between the dynamic sealing lip 24 and the mating relatively rotatable surface becomes a dynamic sealing interface. The lubricant side of dynamic sealing lip 24 develops a converging relationship with the relatively rotatable surface a result of the compressed shape of hydrodynamic inlet radius 38.

In response to relative rotation between the seal and the relatively rotatable surface, the dynamic sealing lip 24 generates a hydrodynamic wedging action that introduces a lubricant film between dynamic sealing surface 26 and the relatively rotatable surface.

The compression of the seal against a relatively rotatable surface results in compressive interfacial contact pressure that is determined primarily by the modulus of the material the seal is made from, the amount of compression, and the shape of the seal. The magnitude and distribution of the interfacial contact pressure is one of the most important factors relating to hydrodynamic and exclusionary performance of the seal.

The prior art seals are best suited for applications where the pressure of the lubricant is higher than the pressure of the environment. In the absence of lubricant pressure, the compressed shape of the environment end 22 becomes increasingly concave with increasing compression because the compression is concentrated at one end of the seal. This reduces interfacial contact pressure near circular exclusionary geometry 28 and detracts from its exclusionary performance. In the presence of differential pressure acting from the lubricant side of the seal, the environment end 22 is pressed flat against the wall of the housing groove, which increases the interfacial contact pressure near circular exclusionary geometry 28 and improves exclusionary performance.

Although such seals perform well in many applications, there are others where increased lubricant film thickness is desired to provide lower torque and heat generation and permit the use of higher speeds and thinner lubricants. U.S. Pat. No. 6,109,618 is directed at providing a thicker film and lower torque, but the preferred, commercially successful embodiments only work in one direction of rotation, and are not suitable for applications having long periods of reversing rotation.

Interfacial contact pressure near hydrodynamic inlet radius 38 tends to be relatively high, which is not optimum from a hydrodynamic lubrication standpoint, and therefore from a running torque and heat generation standpoint. Hydrodynamic inlet radius 38 is relatively small, and therefore the effective hydrodynamic wedging angle developed with the relatively rotatable surface is relatively steep and inefficient.

Running torque is related to lubricant shearing action and asperity contact in the dynamic sealing interface. Although the prior art hydrodynamic seals run much cooler than non-hydrodynamic seals, torque-related heat generation is still a critical consideration. The prior art seals are typically made from elastomers, which are subject to accelerated degradation at elevated temperature. For example, media resistance problems, gas permeation problems, swelling, compression set, and pressure related extrusion damage all become worse at elevated temperature. The prior art seals cannot be used in some high speed or high-pressure applications simply because the heat generated by the seals exceeds the useful temperature range of the seal material.

In many of the prior art seals, interfacial contact pressure decreases toward circular exclusionary geometry 28, and varies in time with variations in the width of the interfacial contact footprint. Neither effect is considered optimum for exclusion purposes. When environmental contaminant matter enters the dynamic sealing interface, wear occurs to the seal and the relatively rotatable surface.

Seal life is ultimately limited by susceptibility to compression set and abrasion. Many applications would benefit from a hydrodynamic seal having the ability to operate with greater initial compression, to enable the seal to tolerate greater misalignment, tolerances, abrasion, and compression set without loosing sealing contact with the relatively rotatable surface.

Prior art seals can be subject to twisting within the housing groove. Such seals are relatively stable against clockwise twisting, and significantly less stable against counterclockwise twisting, with the twist direction being visualized with respect to FIG. 1. Commonly assigned U.S. Pat. Nos. 5,230,520, 5,873,576 and 6,036,192 are directed at helping to minimize such counter-clockwise twisting.

When counter-clockwise twisting occurs, interfacial contact pressure increases near hydrodynamic inlet radius 38 and decreases near circular exclusionary geometry 28, which reduces exclusionary performance. Such twisting can also make the seal more prone to skewing within the housing groove.

As described in U.S. Pat. No. 5,873,576, the static sealing surface 27 at the outer diameter of the seal is of larger diameter than the diameter of the mating counter-surface of the seal installation groove so that radial compression occurs at the time of assembly as intended. The diametric difference between the outer diameter of the seal and the mating counter-surface of the groove also causes the seal to undergo circumferential compression at the time of installation, as well as the intended radial compression, which causes the troublesome secondary effect known as "skew". U.S. Pat. No. 5,873,576 teaches that typical hydrodynamic seals can suffer skew-induced wear in the absence of differential pressure, resulting from "snaking" in the gland that is related to circumferential compression and thermal expansion. If this snaking/skewing is present during rotation, the seal sweeps the shaft, causing environmental media impingement against the seal. U.S. Pat. No. 5,873,576 describes the skew-induced impingement wear mechanism in detail, and describes the use of resilient spring projections to prevent skew. Testing has shown that the projections successfully prevent skew-induced wear in the absence of pressure, as was intended, and as such are an improvement over older designs. However, if the environmental pressure exceeds the lubricant pressure, the differential pressure can, in some embodiments, deform the seal in ways that are less favorable to environmental exclusion.

According to the present invention as well as the prior art, sealing is being accomplished between a first machine component or member, such as a housing and a relatively rotatable surface of a second machine component or member, such as a rotary shaft. However, it should be borne in mind that the first machine component, the housing, may be rotatable relative to a fixed shaft, or both the housing and shaft may be rotatable and thus relatively rotatable one to the other. Thus, the terms "machine component" or "relatively rotatable member" are each intended to encompass fixed or rotatable mechanical structures or members that may have rotation relative to one another.

Referring now to the prior art illustration of FIG. 1A, there is shown a cross-sectional view of a prior art seal representative of the commercial embodiment of U.S. Pat. No. 5,678,829. Features in FIG. 1A that are represented by the same numbers as those in FIG. 1 have the same function as the features of FIG. 1. Solid lines represent the uninstalled condition of the seal, and dashed lines represent the installed condition.

An annular recess 49 defines flexible body lips 52 and 55, one of which incorporates the dynamic sealing surface 26, angulated flank 30, hydrodynamic inlet radius 38, and circular exclusionary geometry 28. The reduction of interfacial contact pressure near the circular exclusionary geometry is particularly severe in such seals because of the hinging of the flexible body lips, which angularly displaces the dynamic sealing surface 26 and circular exclusionary geometry 28. This tends to "prop up" the circular exclusionary geometry 28 as shown, minimizing its effectiveness.

BRIEF SUMMARY OF THE INVENTION

The present invention relates to generally circular rotary shaft seals suitable for bi-directional rotation that are used to partition a first fluid from an second fluid, and that exploit at least one of the first and second fluids as a lubricant to lubricate at a dynamic sealing interface. It is preferred that the first fluid be a liquid-type lubricant, however in some cases other fluids such as water or non-abrasive process fluid can be used for lubrication. The second fluid may be any type of fluid, such as a liquid or gaseous environment or a process media, or even a vacuum-type environment.

The seal of the present invention is positioned by a machine element such as a housing, and compressed against a relatively rotatable surface, initiating sealing therebetween. The machine element may define a circular seal groove for positioning the seal. When relative rotation occurs, the seal preferably maintains static sealing with the machine element, and the relatively rotatable surface slips with respect to the seal at a given rotational velocity. (Alternate embodiments are possible wherein the seal can slip with respect to both the machine element and the relatively rotatable surface.)

The preferred embodiment of the seal incorporates at least one sloping surface having varying slope and depth that deforms when compressed into sealing engagement against the relatively rotatable surface to define a hydrodynamic wedging angle with respect to the relatively rotatable surface, and to define an interfacial contact footprint of generally circular configuration but varying in width, being non-circular on at least the first footprint edge due to the aforementioned variations. The non-circular (i.e. wavy) first footprint edge hydrodynamically wedges a lubricating film of the first fluid into the interfacial contact footprint in response to a component of the relative rotational velocity, causing it to migrate toward the second footprint edge. The sloping geometry provides particularly efficient hydrodynamic lubrication because it establishes a relatively small wedging angle with respect to the relatively rotatable surface, and because it provides for a gradual increase in interfacial contact pressure from the first footprint edge to the second footprint edge. The first footprint edge is sometimes referred to as the "lubricant side" or "hydrodynamic edge", and the second footprint edge is sometimes referred to as the "environment side" or "exclusion edge". The number and amplitude of the waves at the first footprint edge can vary as desired. The relatively rotatable surface can take any suitable form, such as an externally or internally oriented cylindrical surface, or a substantially planar surface, without departing from the spirit or scope of the invention.

In the preferred embodiment, the varying slope geometry, called the sloping surface, is provided by a combination of one or more varying angle surfaces and varying curvature surfaces of any suitable shape. Simplified embodiments are possible wherein only varying angle surfaces or varying curvature surfaces are provided.

The specific angle of the variable angle surface and the specific curvature of the variable curvature surface, and the overall cross-sectional compressive depth dimension vary around the circumference of the seal. The variations of these items may be sinusoidal, or any other suitable repetitive or non-repetitive pattern of variation. The variable curvature surface can consist of any type or combination of curve, such a radius, and portions of curves such as ellipses, sine waves, parabolas, cycloid curves, etc. The net effect of varying the slope of the sloping surface around the circumference of the seal is to cause variations in the magnitude and location of installation compression. The variations in the depth dimension also causes variations in the magnitude and location of installation compression, and helps to minimize contact pressure variations around the circumference of the seal.

The preferred embodiment provides a dynamic exclusionary intersection of abrupt form that deforms when installed to provide the interfacial contact footprint with a second footprint edge, sometimes called the "environment edge", that is substantially circular to prevent hydrodynamic wedging action and resist environmental exclusion. In the preferred embodiment, the dynamic exclusionary intersection is an intersection between the sloping surface and the second seal end.

The preferred embodiment incorporates a dynamic sealing lip and a static sealing lip of generally circular configuration that are in generally opposed relation to one another to minimize compression-induced twisting of the seal cross-section. In the preferred embodiment, the varying slope geometry is defined by the dynamic sealing lip, and the static sealing lip has an opposed surface that is an angulated peripheral sealing surface of generally circular form for establishing static sealed relationship with the machine element.

In the preferred embodiment, an energizer of a form common to the prior art having a modulus of elasticity different from the seal body, such as an elastomeric ring, a garter spring, a canted coil spring, or a cantilever spring, is provided to load the varying sloping geometry of the dynamic sealing lip against the relatively rotatable surface. In simplified embodiments, the energizer can be eliminated, such that the seal has one or more flexible lips, or such that the seal is solid and consists of a single material.

In the preferred embodiment, the seal defines generally opposed first and second seal ends, and the second seal end is curved outward in a generally convex configuration in the uncompressed shape. When installed the convex shape changes to a straighter configuration that helps to maintain contact pressure at the second edge of the interfacial contact footprint. In the preferred embodiment, the dynamic exclusionary intersection is an intersection with the second seal end.

The generally circular body of the preferred seal embodiment defines a dynamic control surface and a static control surface near the first seal end that are in generally opposed relation to one another, and can react respectively against the relatively rotatable surface and the machine element to minimize undue twisting of the installed seal, which helps to maintain adequate interfacial contact pressure at the second footprint edge, thereby facilitating resistance to intrusion of abrasives that may be present in the second fluid.

The preferred seal cross-section defines a depth dimension from the sloping surface to the opposed surface, and also defines a length dimension from the first seal end to second seal end. In the preferred embodiment of the present invention, the ratio of the length dimension divided by the depth dimension is preferred to be greater than 1.2 and ideally is in the range of about 1.4 to 1.6 to help minimize seal cross-sectional twisting.

The seal can be configured for dynamic sealing against a shaft, a bore, or a face. Simplified embodiments are possible wherein one or more features of the preferred embodiment are omitted, provided that at a minimum, either the slope of the sloping surface or the depth dimension of the cross-section varies about the circumference of the seal to provide changes in the magnitude and location of compression that produces the desired wavy, non-circular interfacial contact footprint lubricant side edge, and the desired interfacial contact pressure profile.

It is one object of this invention to provide a hydrodynamic rotary seal having low torque and efficient exclusionary performance for reduced wear and heat generation.

It is another object to provide a seal that can operate with relatively high compression to better resist abrasives and tolerate runout, misalignment, tolerances, and compression set.

It is also an object of this invention to provide an improved hydrodynamic wedging angle by compressing a sloping surface of a seal against a relatively rotatable surface, to provide efficient hydrodynamic lubrication even when the seal is made from a relatively stiff material.

A further object of the preferred embodiment is to compress a sloping surface of a seal against a relatively rotatable surface, whereby more compression and interfacial contact pressure occurs at a second footprint edge, and less compression and interfacial contact pressure occurs at a first footprint edge.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments thereof which are illustrated in the appended drawings.

It is to be noted, however, that the appended drawings only illustrate typical embodiments of this invention, and are therefore not to be considered limiting of its scope, for the invention may admit to other equally effective embodiments.

In the drawings:

FIG. 1 is a sectional view of a hydrodynamic seal representing the prior art and embodying the subject matter of U.S. Pat. No. 4,610,319;

FIG. 1A is a sectional view of a hydrodynamic seal representing the prior art and embodying the subject matter of U.S. Pat. No. 5,678,829.

Figure 2:
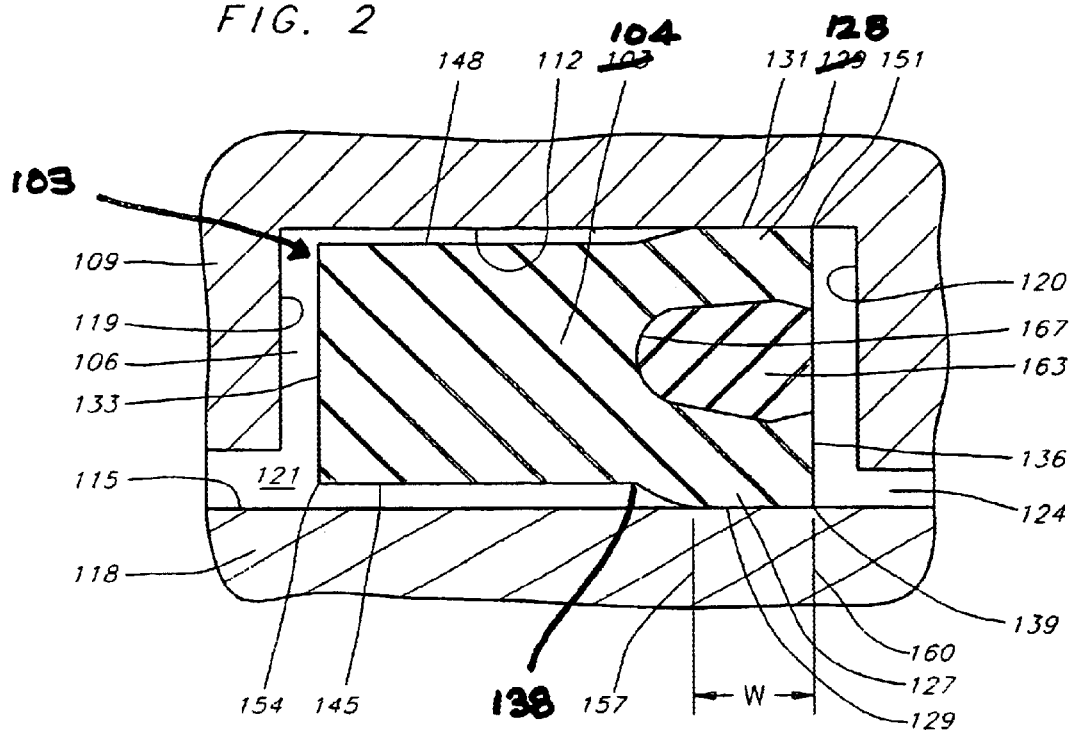
Figure 2A:
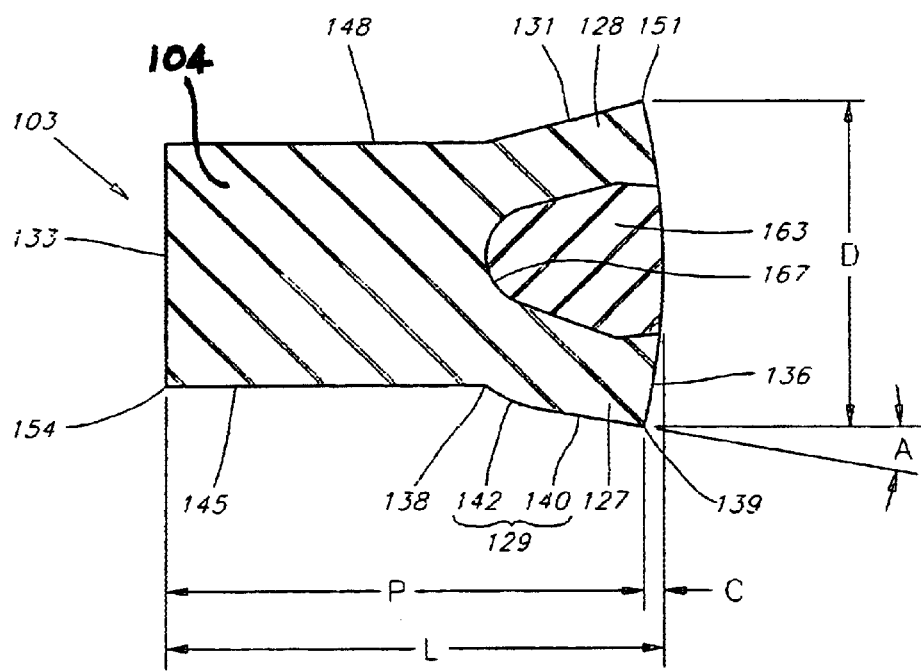
Figure 2B:
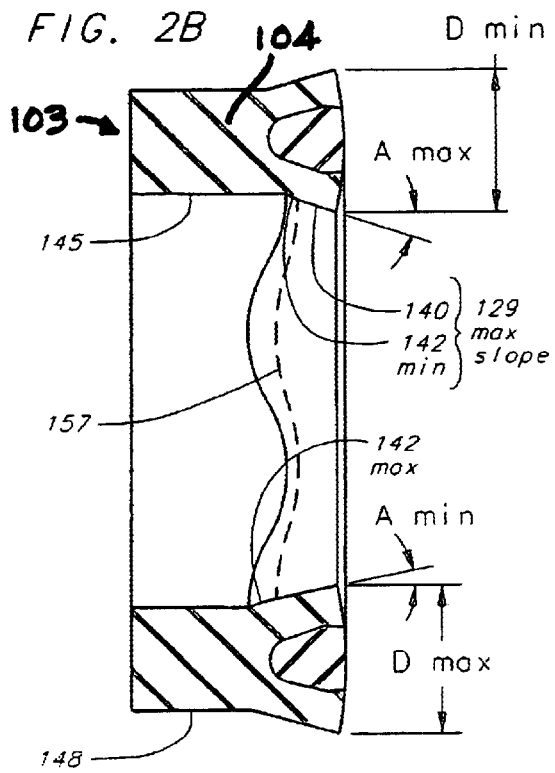
Figure 2C:
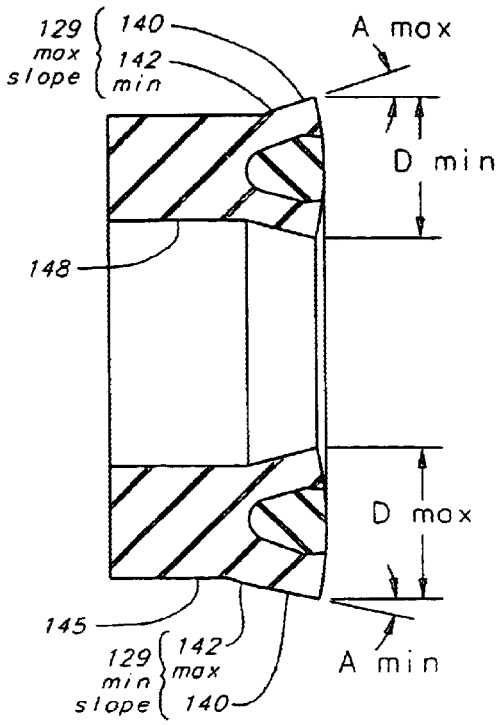
Figure 2D:
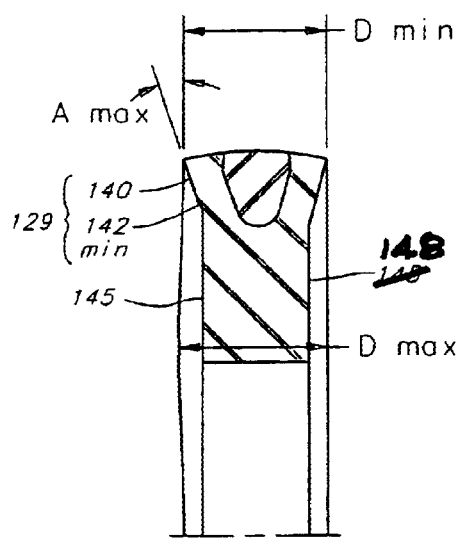
Figure 2E:
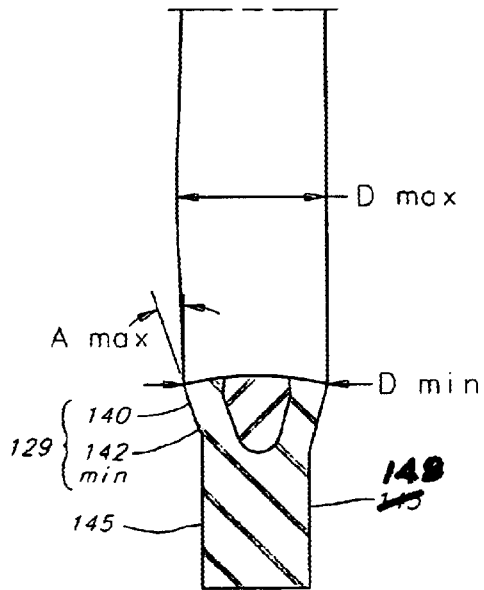
Figure 3:
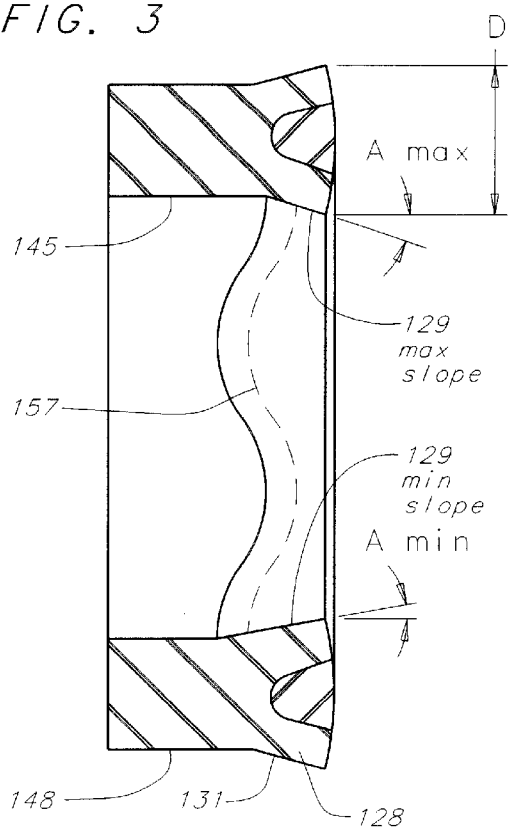
Figure 3A:
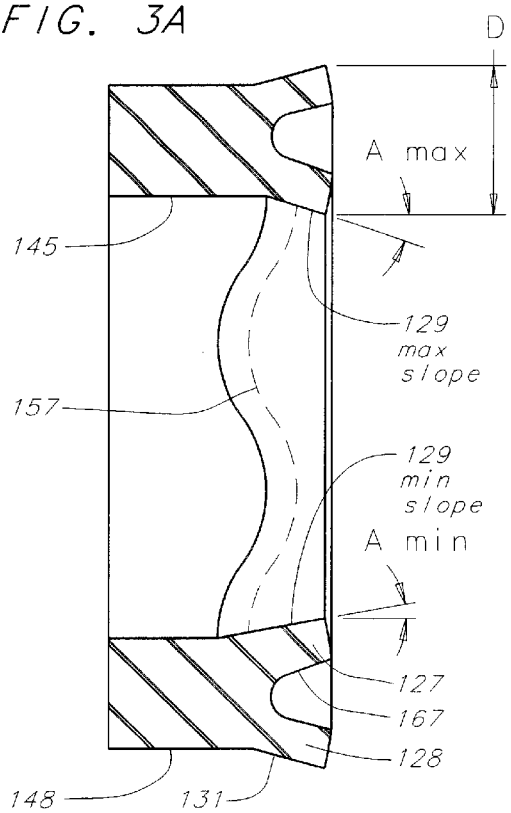
Figure 3B:
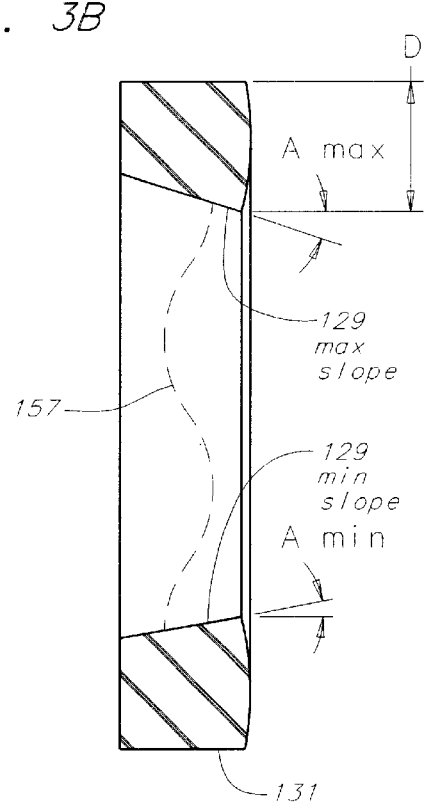

FIG. 2 is a fragmentary cross-sectional view representing the cross-sectional configuration of a ring shaped hydrodynamic seal embodying the principles of the present invention when located in a circular seal groove defined by machine component and compressed against a relatively rotatable surface;

FIG. 2A is a fragmentary cross-sectional view representing the uncompressed cross-sectional configuration of a ring shaped hydrodynamic seal embodying the principles of the present invention;

FIG. 2B is a fragmentary view of an uncompressed hydrodynamic seal embodying the principles of the present invention as configured for sealing against a relatively rotatable external cylindrical surface such as a shaft;

FIG. 2C is a fragmentary view of an uncompressed hydrodynamic seal embodying the principles of the present invention as configured for sealing against a relatively rotatable internal cylindrical surface;

FIGS. 2D and 2E are fragmentary sectional views of uncompressed hydrodynamic seals as configured for sealing against a relatively rotatable planar surface;

FIGS. 3, 3A 3B are sectional views illustrating angular variations of sloping surfaces and showing maximum seal depth in the non-deformed state of the seal;

FIGS. 4, 4A 4B, 4C are sectional views of seals embodying the principles of the present invention and showing sloped surfaces of the seals being defined by curved surfaces;

FIGS. 5 and 5A are sectional views of seals constructed according to the present invention and illustrating the variable depth dimension and sloping surface variation thereof;

FIGS. 6–9C are sectional views of seals embodying the principles of the present invention and showing alternative embodiments of the invention.

DETAILED DESCRIPTION OF THE INVENTION

FIGS. 2–2E represent the preferred embodiment of the present invention. FIG. 2 represents the cross-sectional configuration of the seal when installed, and FIG. 2A represents the uninstalled cross-sectional configuration. Features throughout this specification that are represented by like numbers have the same function. For orientation purposes, it should be understood that in the cross-sections of FIGS. 2 and 2A, and other figures herein, the cross-section of the respective cutting planes passes through the longitudinal axis of the seal.

In FIG. 2, a fragmentary transverse cross-sectional view is shown representing the cross-sectional configuration of the preferred embodiment of the hydrodynamic seal 103 of the present invention when located in and positioned by a circular seal groove 106 defined by machine component 109 (such as a housing) and compressed between groove counter-surface 112 of circular seal groove 106 and relatively rotatable surface 115 of machine component 118. This initiates a static sealing relationship with groove counter-surface 112 and relatively rotatable surface 115 in the same manner as any conventional interference type seal, such as an O-Ring. Groove counter-surface 112 and relatively rotatable surface 115 are in generally opposed relation to one-another. Machine component 109 and machine component 118 together typically define at least a portion of a chamber for locating a first fluid 121. The compressed configuration of the hydrodynamic seal 103 shown in FIG. 2 is representative of its shape when the pressure of first fluid 121 is substantially the same as the pressure of second fluid 124.

Circular seal groove 106 also includes a first groove wall 119 and a second groove wall 120 that are in generally opposed relation to one another. In the hydrodynamic seal industry, first groove wall 119 is often referred to as the "lubricant-side gland wall", and second groove wall 120 is often referred to as the "environment-side gland wall". Although first groove wall 119 and second groove wall 120 are shown to be in fixed, permanent relation to one another, such is not intended to limit the scope of the invention, for the invention admits to other equally suitable forms. For example, first groove wall 119 and/or second groove wall 120 could be configured to be detachable from machine component 109 for ease of maintenance and repair, but then assembled in more or less fixed location for locating the seal.

Hydrodynamic seal 103, which is of generally ring-shaped configuration and having a generally circular annular seal body 104, is used to partition the first fluid 121 from the second fluid 124, and to prevent intrusion of the second fluid 124 into the first fluid 121 retaining the first fluid 121 within the above-noted chamber. The first fluid 121 is exploited in this invention to lubricate the dynamic sealing interface, and is preferably a liquid-type lubricant such as a synthetic or natural oil, although other fluids including greases, water, and various process fluids are also suitable for lubrication of the seal in some applications. The second fluid 124 may be any type of fluid desired, such as a lubricating media, a process media, an environment, etc. Relatively rotatable surface 115 can take the form of an externally or internally oriented substantially cylindrical surface, as desired, with hydrodynamic seal 103 compressed radially between groove counter-surface 112 and relatively rotatable surface 115. Alternatively, relatively rotatable surface 115 can take the form of a substantially planar surface, with hydrodynamic seal 103 compressed axially between a groove counter-surface 112 and relatively rotatable surface 115 of substantially planar form. Illustrations of the preferred embodiment as configured for radial compression are shown in FIGS. 2B and 2C. Illustrations of the preferred embodiment as configured for axial compression are shown in FIGS. 2D and 2E.

In the preferred embodiment, hydrodynamic seal 103 incorporates a dynamic sealing lip 127 and a static sealing lip 128 that are of generally circular configuration. It is preferred that static sealing lip 128 be in generally opposed relation to dynamic sealing lip 127, as shown, to minimize the potential for twisting of the seal within the gland. In simplified embodiments, such lips are not necessarily required, as will be shown later. It is preferred that the uninstalled profile of the static sealing lip 128 mimic the average profile of the dynamic sealing lip 127 to provide a degree of compressive symmetry, although the overall projection of the two lips need not be identical.

Hydrodynamic seal 103 defines a sloping surface 129 for facing the relatively rotatable surface 115 that is shown in FIG. 2. Hydrodynamic seal 103 also defines opposed surface 131 which is generally circular and in generally opposed relation to sloping surface 129. Opposed surface 131 is preferred to be of generally sloping configuration as shown, but can take other specific forms without departing from the spirit or scope of the invention, as shown in other figures herein.

The cross-section of hydrodynamic seal 103 defines a first seal end 133 for facing the first groove wall 119 shown in FIG. 2 and also defines an second seal end 136 for facing second groove wall 120 shown in FIG. 2. In the hydrodynamic seal industry, first seal end 133 is often referred to as the "lubricant end", and second seal end 136 is often referred to as the "environment-end". The first seal end 133 of the seal cross-section is preferred to be in generally opposed relation to the second seal end 136, and it is preferred that the second seal end 136 be curved outward as shown in a generally convex shape, in the uninstalled condition. The generally convex shape can consist of one or more curves, or can be approximated by straight line segments. Installation of hydrodynamic seal 103 compresses a portion of sloping surface 129 against the relatively rotatable surface 115 and establishes an interfacial contact footprint of generally circular form and having a width dimension W which varies in size about the circumference of hydrodynamic seal 103 in time with variations in the magnitude and location of compression resulting from the variations in the "key variables" that are defined below. Sloping surface 129, in the preferred embodiment, extends in sloping fashion from dynamic exclusionary intersection 139 to body intersection 138. and can be comprised of any suitable sloping shape or combination of sloping shapes as desired. In FIGS. 2 and 2A, sloping surface 129 includes variable angle surface 140 oriented at variable angle A and also defines variable curvature surface 142. The specific angle of variable angle dimension A varies about the circumference of hydrodynamic seal 103. Variable curvature surface 142 can be any type of curve, such as but not limited to a radius, a portion of an ellipse, a portion of a sine wave curve, a portion of a parabolic curve, a portion of a cycloid curve, a portion of witch/versiera curves, or combinations thereof, etc. There is not a tremendous dimensional difference between a straight sloping line and differing types of curved sloping lines at the scale that seal lips of the present invention are typically manufactured. All can be used to produce a sloping surface 129 that varies in slope about the circumference of the seal, therefore all can be used to achieve the hydrodynamic effect described herein if appropriately sized. One advantage, however, of incorporating variable curvature surface 142 in conjunction with variable angle surface 140 is that the variable curvature surface 142 helps to limit the maximum interfacial contact footprint width dimension W in conditions of unusually high swell or compression.

Hydrodynamic seal 103 defines a dynamic control surface 145 for facing the relatively rotatable surface 115 that is shown in FIG. 2, and also defines a static control surface 148 for facing the groove counter-surface 112 that is shown in FIG. 2. Dynamic control surface 145 cooperates with the relatively rotatable surface and static control surface 148 cooperates with the circular seal groove to prevent undue twisting of the installed seal within the seal groove.

Hydrodynamic seal 103 defines a depth dimension D from opposed surface 131 to sloping surface 129, and also defines a Length dimension L from first seal end 133 to second seal end 136. Dynamic exclusionary intersection 139 is preferably an abrupt exclusionary geometry adapted to be exposed to the second fluid 124 for excluding intrusion of second fluid 124. Dynamic exclusionary intersection 139 is located by a positional dimension P from body intersection 154. Length dimension L and positional dimension P are preferred to be constant about the circumference of hydrodynamic seal 103. In the preferred embodiment, owing to the preferred curvature of second seal end 136, positional dimension P is less than Length dimension L, however it is understood that these dimensions could be substantially equal if the uninstalled curvature of second seal end 136 is small or substantially absent.

In the preferred embodiment, at least one and preferably all of the following, hereafter referred to collectively as "key variables" vary in magnitude around the circumference of hydrodynamic seal 103 to cause variations in the magnitude and location of compression:

variable angle dimension A, depth dimension D, and/or the curvature of variable curvature surface 142.

When at least one and preferably all of the above-listed items vary in magnitude, the interfacial contact footprint of the sloping surface 129 against the relatively rotatable surface provides an outstanding combination of hydrodynamic lubrication and exclusion characteristics. The variations in variable angle dimension A, depth dimension D, and the curvature of variable curvature surface 142 may be sinusoidal, or any other suitable repetitive or non-repetitive pattern of variation.

When relative rotation is absent, a liquid tight static sealing relationship is maintained at the interface between opposed surface 131 and groove counter-surface 112, and at the interface between sloping surface 129 and relatively rotatable surface 115. When relative rotation occurs between circular seal groove 106 and relatively rotatable surface 115, the hydrodynamic seal 103 remains stationary with respect to groove counter-surface 112 and maintains a static sealing relationship therewith, while the interface between sloping surface 129 and relatively rotatable surface 115 becomes a dynamic sealing interface such that relatively rotatable surface 115 slips with respect to sloping surface 129 at a given rotational velocity "V". The relative rotation direction is normal (perpendicular) to the plane of the cross-section depicted in FIG. 2.

In the installed condition, dynamic sealing lip 127 deforms to establish an interfacial contact footprint against relatively rotatable surface 115. This footprint has a width dimension W that varies in size about the circumference of hydrodynamic seal 103 due to variations in compression caused by the variations in one or all of the key variables.

The first footprint edge 157 of the interfacial contact footprint is non-circular; i.e. wavy, due to the variations in one or all of the key variables, and, in conjunction with the deformed shape of sloping surface 129, produces a hydrodynamic wedging action in response to relative rotation between the hydrodynamic seal 103 and the relatively rotatable surface 115. This hydrodynamic wedging action wedges a film of lubricating fluid (i.e. first fluid 121) into the interfacial contact footprint between the dynamic sealing lip 127 and the relatively rotatable surface 115 for lubrication purposes, which reduces wear, torque and heat generation. The number and amplitude of the waves at the first footprint edge 157 can be varied to achieve the desired hydrodynamic lubricant film thickness.

The second footprint edge 160 (sometimes called the "environment edge") of the interfacial contact footprint is substantially circular, and therefore does not produce a hydrodynamic wedging action in response to relative rotation between the hydrodynamic seal 103 and the relatively rotatable surface 115, thereby facilitating exclusion of second fluid 124.

Owing to the sloping nature of sloping surface 129 and the preferably sloping nature of opposed surface 131, when hydrodynamic seal 103 is installed, more compression occurs at the second footprint edge 160 of the interfacial contact footprint (where more compression is desirable to compensate for abrasive wear resulting from exposure to any abrasives that may be present in the second fluid 124) and less compression occurs at the first footprint edge 157 of the interfacial contact footprint. This means that interfacial contact pressure within the interfacial contact footprint between the dynamic sealing lip 127 and the relatively rotatable surface 115 is less at first footprint edge 157 and significantly greater at second footprint edge 160.

In this preferred embodiment, variable angle dimension A is preferred to be less than 30 degrees, and is ideally in the range of 5–25 degrees. Smaller angles provide an improved convergence, or wedging angle, between sloping surface 129 and relatively rotatable surface 115, and prevent a rapid rise in interfacial contact pressure near the first footprint edge 157. The small convergence angles of this invention provide efficient hydrodynamic wedging action, even when the dynamic sealing lip 127 is made from a relatively stiff material such as a 90–97 durometer Shore A elastomer, a fabric-reinforced elastomer, or a plastic or reinforced plastic material. Conversely, the preferably abrupt angle of convergence at dynamic exclusionary intersection 139 provides a rapid rise in contact pressure at the second footprint edge 160. Compression of sealing material in compressive region C (which in the uninstalled state overhangs past dynamic exclusionary intersection 139) further adds to the magnitude of interfacial contact pressure near second footprint edge 160, and therefore enhances exclusionary performance.

As noted previously, the installed shape of the environment end of prior art seals becomes somewhat concave in the absence of pressure, particularly at high levels of compression. This reduces environment-edge interfacial contact pressure, and reduces exclusionary performance. In the present invention, this problem is addressed by making the second seal end 136 of the cross-section generally convex, so that when hydrodynamic seal 103 is installed, the second seal end 136 becomes approximately straight (as shown in FIG. 2), rather than concave and, as shown in FIG. 2, the second seal end becomes approximately perpendicular to relatively rotatable surface 115. Finite element analysis has shown that the convex uninstalled shape is particularly desirable in the present invention. The compressive reaction caused by the angle of sloping surface 129 and opposed surface 131 tends to exaggerate the formation of a concave second seal end 136 under compression unless this tendency is addressed by implementing the convex end shape shown.

Because the interfacial contact pressure builds gradually from first footprint edge 157 to second footprint edge 160, and the wedging angle is low, an ideal condition exists for efficient hydrodynamic lubrication of the interfacial contact footprint, and for producing low running torque and low heat generation. Experiments conducted by the inventors and their associates has shown that the torque of seals of the present invention is relatively low, even when the dimensional compression is significantly greater than the prior art. Because the torque is low, the seal of the present invention generates less heat, and is therefore suitable for a wider speed range and higher environmental temperatures. Unlike the commercial embodiments of U.S. Pat. No. 6,109,618, which are also directed at providing a thicker lubricant film and lower torque, the present invention does not have a unidirectional wave pattern, and works equally well in either direction of rotation.

Because the seal of the present invention can operate with high compression, and has high contact pressure near the second footprint edge 160, it resists intrusion of the second fluid 124, and provides dimensionally more material to sacrifice to abrasion, allowing long service life in the presence of abrasives within second fluid 124. The high compression also helps to make the seal tolerant of runout, misalignment, tolerances, and compression set. Testing also suggests that the amount of first fluid 121 that is lost to hydrodynamic leakage is less with the present invention; this desirable characteristic is attributed to the higher interfacial contact pressure near second footprint edge 160.

In the prior art seals, interfacial contact pressure at the environment edge of the footprint was lower at the circumferential locations where the interfacial contact footprint was widest. In the preferred embodiment of the present invention, as the width dimension W of the interfacial contact footprint increases locally to variations in the key variables, the interfacial contact pressure at the second footprint edge 160 remains more constant because the depth dimension D of the seal increases locally in time with the width dimension W, which causes increased compression where the interfacial contact footprint is wider, and less compression were the interfacial contact footprint is narrower. Due to the variations in depth dimension D, either static exclusionary intersection 151 or dynamic exclusionary intersection 139 (or both) must necessarily be non-circular in the uninstalled condition of the seal. A molding flash line is typically located at both static exclusionary intersection 151 and dynamic exclusionary intersection 139. Non-circularity caused by variations in depth dimension D affects the accuracy of flash trimming operations. Since dynamic exclusionary intersection 139 defines the second footprint edge 160 of the interfacial contact footprint, which is desired to be circular for optimum exclusion resistance, it is preferred that dynamic exclusionary intersection 139 be manufactured circular to maximize the accuracy of flash removal operations at that location. Therefore it is preferred that for any embodiment herein where depth dimension D varies, the static exclusionary intersection 151 be made noncircular, since any inaccuracy in flash removal operations at that location has minimal effect on seal performance. It can be appreciated, however, that in applications where no flash line exists at dynamic exclusionary intersection 139, that intersection can be made non-circular as a result of variations in depth dimension D, yet when it is installed against a relatively rotatable surface, the resulting second footprint edge 160 will be substantially circular.

It has previously been mentioned that the present invention is suitable for both radial compression arrangements and axial compression arrangements. In the case of very large diameter seals, sloping surface 129 and dynamic control surface 145 can simply be manufactured as a generally internally oriented surfaces, with sloping surface 129 configured for sealing against a relatively rotatable surface 115 defining an externally oriented cylindrical surface. The cross-section of large diameter seals can be rotated 90 degrees so that sloping surface 129 becomes a generally axially oriented surface configured for sealing against a relatively rotatable surface 115 of substantially planar form, or can be rotated 180 degrees so that sloping surface 129 becomes an externally oriented surface configured for sealing against a relatively rotatable surface 115 defining an internally oriented cylindrical surface. The relative torsional stiffness of small diameter seals is much higher, and for small seals the sloping surface 129 should be pre-oriented in the desired configuration at the time of manufacture.

Radial compression of seals not only causes radial compression, but also causes a certain amount of circumferential compression (as described in U.S. Pat. No. 5,873,576) that can cause unpressurized seals to twist and skew (i.e. snake) within the gland. In such cases, the sealing lip "sweeps" the shaft, causing environmental impingement and seal wear. Circumferential compression-induced skewing is in part related to what proportion of the seal is being initially compressed, the magnitude of compression, how stiff the cross-section is proportional to the diameter, and how the thermal expansion of the seal is constrained.

In the preferred embodiment shown, when used in radial compression, only a relatively small percentage of the seal body is subject to compression between relatively rotatable surface 115 and groove counter-surface 112, therefore in radial compression applications, only a relatively small portion of the seal is circumferentially compressed. A much larger portion of the seal is not circumferentially compressed, and therefore serves to inhibit circumferential compression-induced skewing. Further, the construction of the seal, owing to the longer than usual length dimension L, is relatively stiff compared to prior art seals, which helps to inhibit local buckling-induced skew.

In the preferred embodiment of the present invention, the ratio of length dimension L divided by depth dimension D is preferred to be greater than 1.2 and ideally is in the range of about 1.4 to 1.6. Many styles of prior art seals are prone to significantly reduced interfacial contact pressure near second footprint edge 160 resulting from torsional twisting of the seal cross-section within the seal groove, unless the pressure of the lubricant is higher than the pressure of the environment. In the preferred embodiment of the present invention, owing to the ratio of length dimension L divided by depth dimension D, the dynamic control surface 145 will contact relatively rotatable surface 115 to prevent further cross-sectional twisting before a significant reduction in interfacial contact pressure near second footprint edge 160 can occur.

The dynamic sealing lip 127 is constructed of a sealing material selected for its wear and extrusion resistance characteristics, and has a predetermined modulus of elasticity. In the preferred embodiment of the present invention, an energizer 163 is provided to load sloping surface 129 against relatively rotatable surface 115 and to load opposed surface 131 against groove counter-surface 112. The energizer 163 can take any of a number of suitable forms known in the art including various forms of springs without departing from the scope or spirit of the invention, as will be discussed later. The material interface between the material forming the dynamic sealing lip 127 and the energizer 163 can also be of any suitable form.

As shown in FIGS. 2 and 2A, Energizer 163 can be a resilient material that has a modulus of elasticity which may be different than the predetermined modulus of elasticity of the dynamic sealing lip 127. For example, the modulus of elasticity of energizer 163 could be lower than the predetermined modulus of elasticity of dynamic sealing lip 127 in order to manage interfacial contact pressure to optimum levels for lubrication and low torque. Energizer 163 may be bonded to or integrally molded with the rest of the seal to form a composite structure, or can be simply be a separate piece mechanically assembled to the rest of the seal. Other suitable types of energizers are shown in subsequent figures. The energizer 163 shown in the various figures herein can be of any of the various types of energizer discussed herein without departing from the spirit or scope of the invention. The hydrodynamic seal 103 of FIGS. 2–2E is illustrated as a compression-type seal, but can be converted to a flexing lip type seal by elimination of the energizer 163, as can the other seal figures herein that illustrate an energizer 163 that is contained within an annular recess.

FIGS. 2B–2E show that the basic concept of the preferred embodiment can be configured for dynamic sealing against a shaft, a bore, or a face without departing from the spirit or essence of the invention. In FIGS. 2B–2E, the slope of sloping surface 129 changes from minimum to maximum around the circumference of the hydrodynamic seal. This is because depth dimension D is larger at Dmax compared to Dmin, variable angle dimension A is greater at A max compared to A min, and variable curvature surface 142 has a tighter curvature at 142 min compared to 142 max.

FIG. 2B is a fragmentary cross-sectional view of an uninstalled hydrodynamic seal 103 for being compressed in a radial direction for sealing against a relatively rotatable surface of external cylindrical form, such as the exterior surface of a shaft. Sloping surface 129 and dynamic control surface 145 are generally internally oriented surfaces, with sloping surface 129 configured for sealing against an external cylinder. A dashed line is used to illustrate the first footprint edge 157 of the interfacial contact footprint that is established when the seal is installed; first footprint edge 157 is wavy in nature as described previously in conjunction with FIGS. 2 and 2A. As can be seen in FIG. 2B, the wavy nature of the first footprint edge 157 causes the width dimension of the interfacial contact footprint to vary about the circumference of the seal.

FIG. 2C is a fragmentary cross-sectional view of an uninstalled hydrodynamic seal as configured for being compressed in a radial direction for sealing against a relatively rotatable surface of internal cylindrical form, such as a bore. Sloping surface 129 and dynamic control surface 145 are externally oriented surfaces, with sloping surface 129 configured for sealing against a bore.

FIGS. 2D and 2E are fragmentary cross-sectional views of uninstalled hydrodynamic seals as configured for being compressed in an axial direction for sealing against a relatively rotatable surface of substantially planar form. Sloping surface 129 and dynamic control surface 145 are generally axially oriented surfaces, with sloping surface 129 configured for sealing against a face. In FIG. 2D the sloping surface 129 and dynamic exclusionary intersection 139 are positioned for having the first fluid, i.e. a lubricating fluid, toward the inside of the seal, and in FIG. 2E they are positioned for having the first fluid toward the outside of the seal.

As will be readily apparent to those skilled in the art, the "key variables" can be used together as shown in FIGS. 2–2E for maximum benefit, or they can be used independently of one another if desired for the purpose of simplification. FIGS. 3–3B show several simplifications of the invention based on the benefits provided by the variable angle surface described in conjunction with FIGS. 2–2E. In FIGS. 3–3B, a dashed line is used to illustrate the first footprint edge 157 of the interfacial contact footprint that is established when the seal is installed. The first footprint edge 157 is, noncircular; i.e. wavy in nature.

In FIGS. 3–3B, the sloping surface 129 varies from a maximum slope to a minimum slope, and is comprised entirely of a variable angle surface; the variable curvature surface of the preferred embodiment having been eliminated as a simplification. Depth dimension D may, if desired, vary in size about the circumference of the seals of FIGS. 3–3B as discussed previously in conjunction with FIGS. 2–2E, or as a further simplification, depth dimension D may remain constant in size. In the seals of FIGS. 3 and 3A, dynamic control surface 145 cooperates with the relatively rotatable surface and static control surface 148 cooperates with the circular seal groove to prevent undue twisting of the installed seal within the seal groove. In FIG. 3B the dynamic control surface has been eliminated as a further simplification. FIGS. 3 and 3A retain the static sealing lip 128 having the function discussed previously in conjunction with FIGS. 2–2E, but in FIG. 3B the static sealing lip has been eliminated as a further simplification, and the opposed surface 131 is provided by a non-projecting periphery of the seal. Also, as a further L simplification, the seals of FIGS. 3A and 3B eliminate the lower modulus energizing section discussed previously in conjunction with the preferred embodiment of FIGS. 2–2E. Though the preferred embodiment of FIGS. 2–2E incorporates a dynamic sealing lip made from one material, and an energizer made from another material, such is not intended to limit the present invention in any manner whatever. It is intended that the seal of the present invention may incorporate one or more seal materials or components without departing from the spirit or scope of the invention.

In FIG. 3A, the energizing section of the preferred embodiment has been eliminated, leaving a void in the form of an annular recess 167 where the energizing section would otherwise be, and the resulting seal is of the flexing-lip type. Annular recess 167 establishes dynamic sealing lip 127 and static sealing lip 128 as being flexible annular sealing lips. The grooved, flexing-lip seal of FIG. 3A is superior in abrasion resistance, compared to the grooved, flexing-lip seals disclosed in U.S. Pat. No. 5,678,829, because the slope of sloping surface 129 prevents the lifting/propping of the circular exclusionary geometry that occurs in the prior art seals disclosed in U.S. Pat. No. 5,678,829. The flexible annular lip design permits the use of relatively high modulus materials that would otherwise be unsuitable for use in a solid (ungrooved) seal due to the high interfacial contact pressure that would result.

In FIG. 3B, the energizing section of the preferred embodiment has been eliminated by simply constructing the seal as a solid, generally circular seal composed of resilient sealing material, such as an elastomer. This results in simplified manufacture, lower cost, and better dimensional accuracy.

Variable angle dimension A varies about the circumference of the seals of FIGS. 3–3B from minimum to maximum. When the seal is installed against a relatively rotatable surface, the seal deforms to define an interfacial contact footprint against the relatively rotatable surface. The widest portion of the footprint is established by the lowest slope i.e., minimum of sloping surface 129, and the narrowest portion of the footprint is established by the greatest slope i.e., maximum of sloping surface 129. The first footprint edge 157 of the interfacial contact footprint is non-circular; i.e. wavy (as shown by dashed line), due to the variations in variable angle dimension A, and in conjunction with the deformed shape of sloping surface 129, produces a hydrodynamic wedging action in response to relative rotation between the hydrodynamic seal and the relatively rotatable surface. This hydrodynamic wedging action wedges a film of lubricating fluid into the interfacial contact footprint for lubrication purposes, which reduces wear, torque and heat generation. Owing to the sloping nature of sloping surface 129 in the uninstalled state, when the seal is installed, a wedging angle is developed with respect to the relatively rotatable surface that is efficient for producing hydrodynamic lubrication, resulting in low running torque and low heat generation.

Although FIGS. 3–3B show seals for sealing against an external cylindrical surface, the basic cross-sectional configurations are equally suitable for being implemented for face sealing, or sealing against an internal cylindrical surface.

Figure 4:
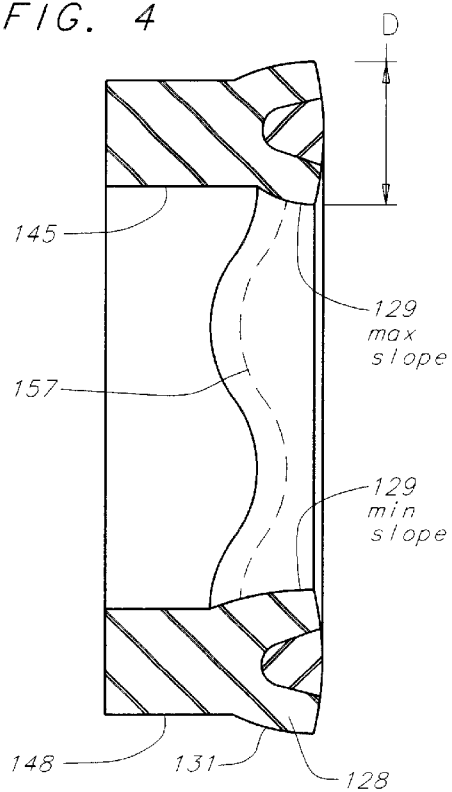
Figure 4A:
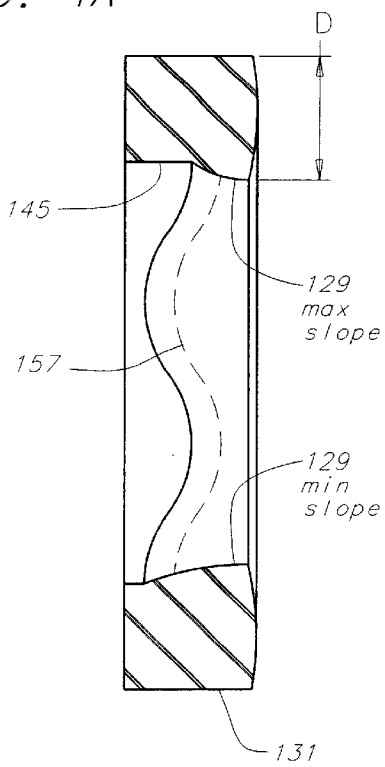
Figure 4B:
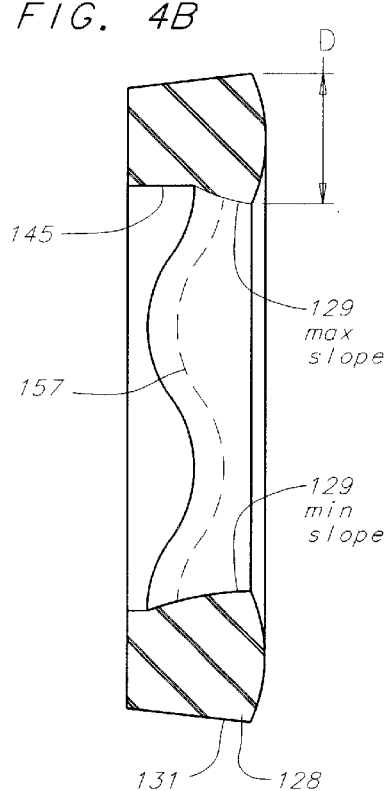
Figure 4C:
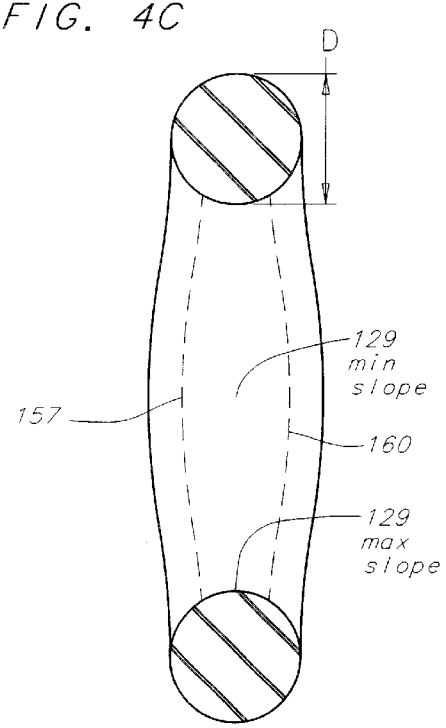

FIGS. 4–4C show several simplifications of the invention based on the benefits provided by varying the slope of sloping surface 129 as described in conjunction with FIGS. 2–2E without including the variable angle surface of the preferred embodiment of FIGS. 2–2E. In FIGS. 4–4C, the sloping surface 129 is comprised entirely of a variable curvature surface that varies in curvature about the circumference of the seal to vary the slope of sloping surface 129, thus varying the magnitude and location of compression when the seal is compressed against a relatively rotatable surface. In the seal of FIG. 4, dynamic control surface 145 cooperates with the relatively rotatable surface and static control surface 148 cooperates with the circular seal groove to prevent undue twisting of the installed seal within the seal groove. In FIG. 4C the dynamic control surface has been eliminated as a further simplification. FIGS. 4 and 4B retain the static sealing lip 128 having the function discussed previously in conjunction with FIGS. 2–2E, but in FIGS. 4A and 4C the static sealing lip has been eliminated as a further simplification. As a further simplification, the seals of FIGS. 4A–4C—eliminate the lower modulus energizing section discussed previously in conjunction with the preferred embodiment of FIGS. 2–2E. The seals are instead simply shown constructed from a single material.

The curvature of the variable curvature surface that defines sloping surface 129 varies about the circumference of the seals of FIGS. 4–4C. When the seal is installed against a relatively rotatable surface, the seal deforms to define an interfacial contact footprint against the relatively rotatable surface, and to form a wavy hydrodynamic inlet geometry providing for hydrodynamic wedging of a lubricating fluid film between sloping surface 129 and the relatively rotatable surface. A dashed line shows the first footprint edge 157 of the interfacial contact footprint that is established when the seal is installed. The first footprint edge 157 of the interfacial contact footprint is non-circular; i.e. wavy, due to the variations in curvature of sloping surface 129, and in conjunction with the deformed shape of sloping surface 129, produces a hydrodynamic wedging action in response to relative rotation between the hydrodynamic seal and the relatively rotatable surface. This hydrodynamic wedging action wedges a film of lubricating fluid into the interfacial contact footprint for lubrication purposes, which reduces wear, torque and heat generation.

The second footprint edge of the interfacial contact footprint of the seals of FIGS. 4–4B is substantially circular, and therefore does not produce a hydrodynamic wedging action in response to relative rotation. The second footprint edge 160 of the interfacial contact footprint of the seal of FIG. 4C is non-circular (wavy) in the absence of differential pressure, but becomes more or less circular in the presence of differential pressure acting from the side of the first footprint edge 157. This seal is ideal for applications, such as the device shown in U.S. Pat. No. 5,979,865 and commonly assigned U.S. utility application Ser. No. 9/776,026, wherein a plurality of rotary seals define a plurality of fluid communication passages between a seal carrier and a relatively rotatable surface, and at least one of the rotary seals is subject to pressure acting from either side, depending upon which of the fluid communication passages are pressurized at any given rime.

In the seals of FIGS. 4–4C, the depth dimension D can either be kept constant about the circumference of the seal for maximum simplicity, or can be made to vary, as desired.

Although FIGS. 4–4B show seals for sealing against an external cylindrical surface, the basic cross-sectional configurations are equally suitable for being oriented for face sealing, or for sealing against an internal cylindrical surface. The seal of FIG. 4C is, as shown, suitable for hydrodynamic lubrication with respect to both internal and external cylindrical surfaces, and with respect to faces, or between opposed generally circular surfaces of any other suitable configuration, such as substantially concentric conical surfaces or substantially concentric spherical surfaces.

FIGS. 5–5A show several simplifications of the invention based on the benefits provided by varying the depth dimension D as described in conjunction with FIGS. 2–2E. In FIG. 5, the sloping surface 129 is comprised entirely of a sloped surface that may be at a substantially unvarying angle around the circumference of the seal. In FIG. 5A, the sloping surface 129 is comprised entirely of a curved surface of substantially unvarying curvature about the circumference of the seal. Depth dimension D varies in size about the circumference of the seals of FIGS. 5 and 5A, as discussed previously in conjunction with FIGS. 2–2E.

When the seal is installed against a relatively rotatable surface, the seal deforms to define a variable width interfacial contact footprint against the relatively rotatable surface. A dashed line shows the first footprint edge 157 of the interfacial contact footprint that is established by installation. The first footprint edge 157 of the interfacial contact footprint is non-circular; i.e. wavy, due to the variations in depth dimension D, and, in conjunction with the deformed shape of sloping surface 129, produces a hydrodynamic wedging action in response to relative rotation between the hydrodynamic seal and the relatively rotatable surface. This hydrodynamic wedging action wedges a film of lubricating fluid into the interfacial contact footprint for lubrication purposes, which reduces wear, torque and heat generation. Owing to the sloping nature of sloping surface 129 in the uninstalled state, when the seal is installed, a wedging angle is developed with respect to the relatively rotatable surface for producing hydrodynamic lubrication.

The environment edge of the interfacial contact footprint of the seals of FIGS. 5 and 5A is substantially circular, and therefore does not produce a hydrodynamic wedging action in response to relative rotation.

Although FIGS. 5–6C show seals for sealing against an external cylindrical surface, the basic cross-sectional configurations are equally suitable for being oriented for face sealing, or for sealing against an internal cylindrical surface.

FIGS. 6–6C show alternate ways of incorporating the energizer 163, which is provided to load sloping surface 129 against a relatively rotatable surface and to load opposed surface 131 against a groove counter-surface. In FIGS. 6–6C, sloping surface 129 may consist of either a variable angle surface, a variable curvature surface, or a combination thereof, as discussed previously in conjunction with other figures. Depth dimension D may also vary in size about the circumference of the seal if desired, as discussed previously in conjunction with other figures. When at least one of the "key variables" is present and varies in magnitude, installation of the sloping surface 129 against a relatively rotatable surface provides a interfacial contact footprint of variable width that is conducive to efficient hydrodynamic lubrication, as discussed previously in conjunction with other figures. The seals of FIGS. 6–6C can be configured to be suitable for radially or axially oriented sealing, as desired.

In FIG. 6, the dynamic sealing lip 127 is made from a first resilient material 162 having a predetermined modulus of elasticity, and the energizer 163 is made from a second material having a modulus of elasticity that is less than that used to form the dynamic sealing lip 127; for example, the energizer 163 could be a 40–80 durometer Shore A elastomer. Thus the extrusion resistance at the dynamic sealing lip 127 is controlled by its modulus of elasticity, but its interfacial contact pressure is controlled by the modulus of elasticity of the energizer 163. This provides good extrusion resistance, and relatively low breakout torque and running torque. The low running torque minimizes running temperature, which moderates temperature related seal degradation. The second seal end 136 is preferred to be convex in the uninstalled condition. In FIG. 6, the energizer 163 comprises the majority of the seal, so that the interfacial contact pressure is not dictated by the relatively higher modulus material of the dynamic sealing lip 127. The material interface 179 between the material forming the dynamic sealing lip 127 and the energizer 163 can be of any suitable form.

It is widely understood that the higher the modulus of elasticity of the sealing material, the more resistant the seal is to high pressure extrusion damage. In the seal of FIG. 6, and the seals of other figures herein which employ an energizer having a lower modulus of elasticity compared to the material of the dynamic sealing lip, the dynamic sealing lip is preferred to be constructed from a hard, relatively high modulus extrusion resistant material such as a flexible polymeric material, a high modulus elastomer such as one having a durometer hardness in the range of 90–97 Shore A, or a fabric, fiber or metal reinforced elastomer, or a high performance temperature-resistant plastic.

In FIG. 6A, the dynamic sealing lip 127 and the static sealing lip 128 are made from a first material having a predetermined modulus of elasticity, and the energizer 163 is made from a second material having a modulus of elasticity that is less than that used to form the dynamic sealing lip 127 and the static sealing lip 128. The energizer 163 takes the form of an insertable annular member that is installed into annular recess 167.

In FIGS. 6B and 6C, the dynamic sealing lip 127 and the static sealing lip 128 are made from a sealing material having a predetermined modulus of elasticity, and the energizer 163 is a spring having a modulus of elasticity that is greater than that used to form the dynamic sealing lip 127 and the static sealing lip 128. In FIG. 6B the energizer 163 is a conventional seal-lip energizing cantilever spring-type, and in FIG. 6C energizer 163 is a conventional seal-lip energizing coil spring, such as a canted coil spring or a garter spring.

FIGS. 7–7B show alternate embodiments of the present invention. The alternate embodiment of FIG. 7 is configured for partitioning two lubricating liquids, for use in devices such as shown in U.S. Pat. No. 5,979,865 and commonly assigned U.S. Utility application Ser. No. 9/776,026. The sloping surface 129 takes the form of a variable curvature surface, the curvature of which varies about the circumference of the seal. The energizer 163 is shown as a coil-type spring, but could be of any of the types of energizer discussed herein without departing from the spirit or scope of the invention. When the dynamic sealing lip 127 is installed against a relatively rotatable surface, the resulting interfacial contact footprint is wavy on both sides (as shown by dashed lines), and thus produces hydrodynamic wedging of lubricating fluid into the dynamic sealing interface from both sides.

In FIG. 7A, the dynamic sealing lip 127 defines a sloping surface 129 comprising a variable angle surface having a variable angle dimension A and also defines dynamic exclusionary intersection 139. The energizer 163 is shown as an O-Ring type energizer, but could be of any of the types of energizer discussed herein without departing from the spirit or scope of the invention. One can easily appreciate that the sloping surface 129 could alternately be comprised of a variable curvature surface instead of variable angle surface. One can also appreciate that, if desired, depth dimension D could also vary about the circumference of the seal. In FIG. 7A, unlike any of the other figures in this specification, the first fluid would be to the right of dynamic exclusionary intersection 139.

In FIG. 7B, the dynamic sealing lip 127 defines two sloping surfaces 129A and 129B, each comprising a variable angle surface having a variable angle dimension. The energizer 163 is shown as an O-Ring type energizer, but could be of any of the types of energizer discussed herein without departing front the spirit or scope of the invention. One can easily appreciate that any of the sloping surfaces 129A and 129B could alternately be comprised of a variable curvature surface instead of variable angle surface. One can also appreciate that, if desired, depth dimension D could also vary about the circumference of the seal. It is sometimes desirable to make the slope of sloping surfaces 129A and 129B different from each other, in order that one produces stronger pumping action than the other; such an arrangement can be used to produce a zero net leakage seal.

Although FIGS. 7–7B show seals for sealing against an external cylindrical surface, the basic cross-sectional configurations are equally suitable for being oriented for face sealing, or for sealing against an internal cylindrical surface.

The fragmentary transverse cross-sectional views of FIGS. 8 and 8A show that the variable slope hydrodynamic geometry can be on both sealing lips, rather than having a static sealing lip and a dynamic sealing lip. This allows the seal to slip in a hydrodynamically lubricated mode with either the relatively rotatable surface, the seal groove, or both. FIGS. 8 and 8A are intended to be interpreted by the standard conventions of multi and sectional view orthographic drawing projection practiced in the United States and described in ANSI Y14.3-1975, an Industry Standardization Document promulgated by ASME. Section 3-4.2.1 has been interpreted to mean that the circumferentially solid portions of the seal, including the narrowest portions of the projecting lips (where slope is at maximum) should be crosshatched in sectional view, while the widest parts of the projecting lips (where slope is at minimum) should be drawn in outline form without cross-hatch lines to avoid conveying a false impression of circumferential solidity.

In FIGS. 8 and 8A, two dynamic sealing lips are provided; first dynamic lip 127A and second dynamic lip 127B. In FIG. 8, both dynamic lips define respective sloping surfaces 129A and 129B comprising variable angle surfaces the respective angles of which vary about the circumference of the seal. In FIG. 8A, both dynamic lips define respective sloping surfaces 129A and 129B comprising respective variable curvature surfaces, the curvature of which varies about the circumference of the seal.

When the seals of FIGS. 8 and 8A are installed between a relatively rotatable surface and a circular seal groove, both of the first and second dynamic lips 127A and 127B establish variable width interfacial contact footprints with their respective counter-surfaces, wherein the width dimension of each footprint varies in size about the circumference of the seal.

In FIGS. 8 and 8A, each of the first footprint edge of each of the interfacial contact footprints is non-circular, i.e. wavy, and in conjunction with the deformed shape of the seal, produces a hydrodynamic wedging action in response to relative rotation between the seal and the respective counter-surfaces of the seal groove and the relatively rotatable surface.

Figure 9:
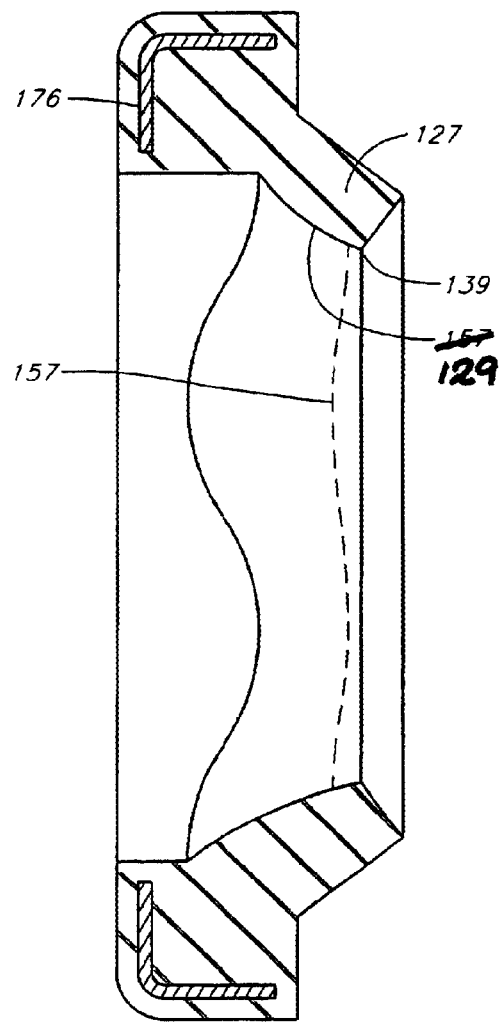
Figure 9A:
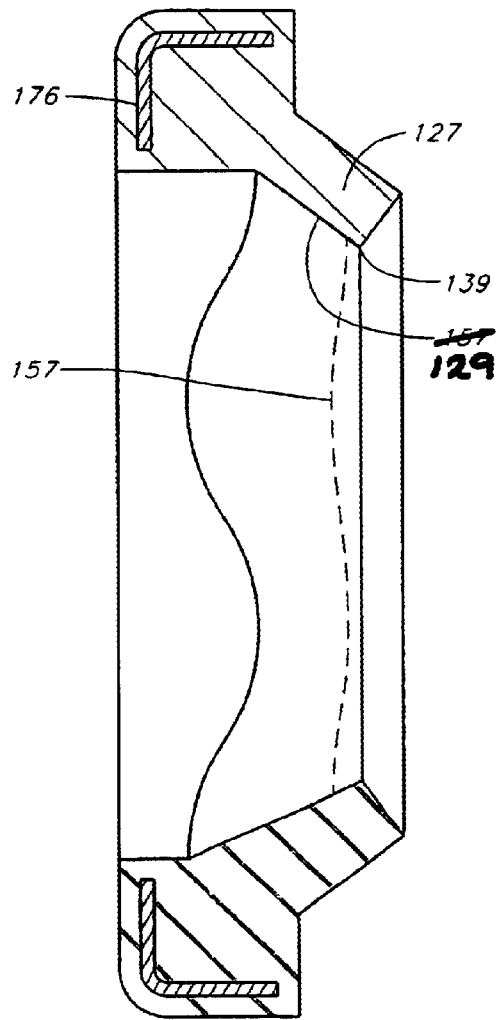

FIGS. 9–9A show that the basic teachings of this invention are applicable to many types of seals. For example, in FIG. 9 a fragmentary cross-section of a rod-scraper type seal is shown defining a dynamic sealing lip 127 of the flexing-lip type having a sloping surface 129 comprising a variable curvature surface that, when installed against a relatively rotatable surface, establishes an interfacial contact footprint that is wavy on one side and circular on the other. A dashed line is used to illustrate the first footprint edge 157 of the interfacial contact footprint that is established when the seal is installed. As another example, in FIG. 9A a fragmentary cross-section of a rod-scraper type seal is shown defining a dynamic sealing lip 127 having a sloping surface 129 comprising a variable angle surface that, when installed against a relatively rotatable surface, establishes an interfacial contact footprint that is wavy on one side and circular on the other. A dashed line is used to illustrate the first footprint edge 157 of the interfacial contact footprint that is established when the seal is installed. As shown in FIGS. 9 and 9A, rod scraper seals may have a metallic insert 176 so that the seal can be press-fit into a bore for retention and static sealing purposes, as is well known in the art of sealing.

Although FIGS. 9–9A show seals for sealing against an external cylindrical surface, the basic cross-sectional configurations are equally suitable for being oriented for face sealing, or for sealing against an internal cylindrical surface.

The basic sealing elements shown herein in FIGS. 2–9A (exclusive of the energizers which are discussed separately) may be composed of any of a number of suitable materials, or combinations thereof, including elastomeric or rubber-like sealing material and various polymeric sealing materials.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

We claim:

1. An annular hydrodynamic seal assembly for sealing between relatively rotatable members at least one of which defines a relatively rotatable surface, said annular hydrodynamic seal assembly serving as a partition between first and second fluids and defining at least a portion of a chamber containing the first fluid, comprising:

a resilient annular seal body defining a seal circumference and having at least one seal end and having at least one annular sealing surface having a varying slope that varies between a minimum slope and a maximum slope about at least part of said seal circumference, said at least one annular sealing surface being deformed by sealing engagement with the relatively rotatable surface of at least one of the relatively rotatable members to define a hydrodynamic wedging angle with respect to the relatively rotatable surface and to define at least a portion of an annular dynamic sealing interface having an annular interfacial contact footprint with the relatively rotatable surface, said annular interfacial contact footprint having first and second footprint edges each having an annular periphery and said first footprint edge being wavy on at least a portion of said annular periphery thereof and together with said hydrodynamic wedging angle establishing hydrodynamic geometry hydrodynamically wedging a lubricating film of the first fluid into said annular dynamic sealing interface in response to rotational movement of the first fluid against said hydrodynamic geometry, causing the lubricating film to migrate within said annular dynamic sealing interface from the chamber to said second footprint edge, and into the second fluid, said varying slope causing said annular interfacial contact footprint to vary in width from a maximum width to a minimum width, and said resilient annular seal body having a dynamic exclusionary intersection being an intersection between said at least one annular sealing surface and said at least one seal end.

2. The annular hydrodynamic seal assembly of claim 1, comprising:

said annular interfacial contact footprint having greater interfacial contact pressure at said second footprint edge resulting from deformation of said at least one annular sealing surface by the relatively rotatable surface as compared with interfacial contact pressure near said first footprint edge.

3. The annular hydrodynamic seal assembly of claim 2, comprising:

said resilient annular seal body having a second annular sealing surface of sloped configuration in generally opposing relation with said at least one annular sealing surface, said at least one annular sealing surface defining an annular seal geometry varying in depth about at least part of said seal circumference.

4. The annular hydrodynamic seal assembly of claim 1, comprising: said second footprint edge being of substantially circular configuration.

5. The annular hydrodynamic seal assembly of claim 1, comprising:

at least one energizer element for loading said at least one annular sealing surface against the relatively rotatable surface and establishing said annular interfacial contact footprint with the relatively rotatable surface.

6. The annular hydrodynamic seal assembly of claim 5, comprising:

said resilient annular seal body having a first modulus of elasticity; and said at least one energizer element having a second modulus of elasticity being greater than said first modulus of elasticity.

7. The annular hydrodynamic seal assembly of claim 5, comprising:

said resilient annular seal body having a first modulus of elasticity; and said at least one energizer element having a second modulus of elasticity being less than said first modulus of elasticity.

8. The annular hydrodynamic seal assembly of claim 1, comprising:

said at least one annular sealing surface being defined at least in part by an annular angulated surface having a varying angle about at least pan of said seal circumference.

9. The annular hydrodynamic seal assembly of claim 1, comprising:

said at least one annular sealing surface being defined at least in part by an annular curved surface having a varying curvature about at least part of said seal circumference.

10. The annular hydrodynamic seal assembly of claim 1, comprising:

said resilient annular seal body defining a dynamic control surface and having a ratio of length dimension divided by depth dimension being greater than 1.2 for resisting interference compression induced cross-sectional twisting of said resilient annular seal body.

11. The annular hydrodynamic seal assembly of claim 1, comprising:

said resilient annular seal body defining a static control surface for resisting interference compression induced cross-sectional twisting of said resilient annular seal body.

12. An annular hydrodynamic seal assembly, comprising:

first and second relatively rotatable members at least one of which defines a relatively rotatable sealing surface, said first and second relatively rotatable members defining at least a portion of a lubricant chamber therebetween, a lubricant being contained within said lubricant chamber;

an annular direct compression type hydrodynamic seal sewing as a partition between said lubricant located within said lubricant chamber and an environment fluid, said hydrodynamic seal having an annular seal body having a seal circumference, at least one seal end and a substantially circular dynamic exclusionary edge exposed to the environment fluid and defining at least one annular sloping surface having a varying slope that varies from a minimum slope to a maximum slope about at least part of said seal circumference, said at least one annular sloping surface defining at least a portion of a dynamic sealing surface, said at least one annular sloping surface being deformed by interference sealing engagement with said relatively rotatable sealing surface defining a hydrodynamic wedging angle and defining at least a portion of a generally annular dynamic sealing interface having an annular interfacial contact footprint with said relatively rotatable sealing surface and having a first lubricant side footprint edge and a second environment side footprint edge, said varying slope causing said first lubricant side footprint edge to have varying distance from said second environment side footprint edge about at least part of said seal circumference, and said varying distance, together with said hydrodynamic wedging angle establishing a hydrodynamic geometry at said first lubricant side footprint edge for hydrodynamically wedging a lubricating film of said lubricant from said lubricant chamber and into said dynamic sealing interface in response to movement of said lubricant by said relatively rotatable sealing surface, causing the lubricating film to migrate within said dynamic sealing interface from said lubricant chamber toward said second environment side footprint edge and toward said substantially circular dynamic exclusionary edge, said substantially circular dynamic exclusionary edge being an intersection between said dynamic sealing surface and said at least one seal end.

13. The annular hydrodynamic seal assembly of claim 12, comprising:

said relatively rotatable sealing surface being an external cylindrical surface; and said annular interfacial contact footprint being defined at least in part by an internal cylindrical surface resulting from deformation of said at least one annular sloping surface by said relatively rotatable sealing surface.

14. The annular hydrodynamic seal assembly of claim 12, comprising:

said relatively rotatable sealing surface being a generally planar surface; and said annular interfacial contact footprint being defined at least in part by a generally annular planar surface resulting from deformation of said at least one annular sloping surface by said relatively rotatable sealing surface.

15. The annular hydrodynamic seal assembly of claim 12, comprising:
said at least one annular sloping surface providing a gradual increase in interfacial contact pressure from said first lubricant side footprint edge to said second environment side footprint edge.

16. The annular hydrodynamic seal assembly of claim 12, comprising:
said at least one annular sloping surface being defined by an annular varying angle surface varying in angle about at least part of said seal circumference.

17. The annular hydrodynamic seal assembly of claim 12, comprising:
said at least one annular sloping surface being defined at least in part by an annular curved surface having varying curvature about at least part of said seal circumference.

18. The annular hydrodynamic seal assembly of claim 12, comprising:
said;
at least one annular sloping surface
defining all of said generally annular dynamic sealing surface.

19. The annular hydrodynamic seal assembly of claim 12, comprising:
annular dynamic and static sealing lips being defined by said annular seal body and being oriented in generally opposed relation for minimizing compression-induced cross-sectional twisting of said annular seal body; and
said at least one annular sloping surface being defined by said annular dynamic sealing lip.

20. The annular hydrodynamic seal assembly of claim 19, comprising:
said static sealing lip having an opposed angulated peripheral sealing surface of generally circular form; and
an annular recess being located between said dynamic sealing lip and said static sealing lip.

21. The annular hydrodynamic seal assembly of claim 12, comprising:
an annular dynamic sealing lip king defined by said annular seal body, said annular dynamic sealing lip defining said at least one annular sloping surface;
said annular seal body king formed of a sealing material having a first modulus of elasticity; and
an annular energizer element formed of a material having a second modulus of elasticity being different from said first modulus of elasticity for loading said at least one annular sloping surface of said dynamic sealing lip against said relatively rotatable sealing surface.

22. The annular hydrodynamic seal assembly of claim 12, comprising:
said at least one seal end being curved outward in a generally convex configuration in the uncompressed configuration of said annular seal body; and
when said annular seal body is placed in compression said generally convex configuration of said at least one seal end being deformed to a configuration enhancing maintenance of contact pressure at said second environment side footprint edge of said annular interfacial contact footprint.

23. The annular hydrodynamic seal assembly of claim 12, comprising:
said annular seal body defining a dynamic control surface and a static control surface being disposed in generally opposed relation and establishing an annular seal body geometry resisting compression induced twisting of said annular seal body and maintaining predetermined interfacial contact pressure of said annular seal body with the relatively rotatable sealing surface at said second environment side footprint edge for resisting intrusion of said environment fluid into said annular interfacial contact footprint.

24. An annular direct compression type hydrodynamic seal having an annular portion thereof in interference sealing engagement between relatively rotatable members one of which defines a relatively rotatable sealing surface and serving as a partition between first and second fluids, comprising:
a resilient annular seal body defining a substantially convex seal end and having a seal circumference and defining at least one annular sloping surface and having an exclusionary edge, said resilient annular seal body having a varying cross-sectional depth varying about at least part of said seal circumference, said at least one annular sloping surface being deformed by said interference sealing engagement and defining a hydrodynamic wedging angle and defining at least a portion of an annular dynamic sealing interface having an annular interfacial contact footprint having a first non-circular footprint edge and having a second footprint edge being defined by said exclusionary edge, said varying cross-sectional depth causing said first non-circular footprint edge to have varying spacing from said second footprint edge about at least part of said seal circumference and causing said annular interfacial contact footprint to have varying width about at least part of said seal circumference and together with said hydrodynamic wedging angle defining a hydrodynamic geometry at said first non-circular footprint edge hydrodynamically wedging a lubricating film of the first fluid into said annular dynamic sealing interface in response to relative rotational movement of the first fluid and said first non-circular footprint edge, causing the lubricating film to migrate within said dynamic sealing interface to said second footprint edge, said second footprint edge being substantially circular and being defined by compressed juncture between said substantially convex seal end and the relatively rotatable sealing surface.

25. An annular hydrodynamic sealing assembly, comprising:
relatively rotatable members defining at least a portion of a fluid chamber containing a first fluid, one of said relatively rotatable members defining a relatively rotatable sealing surface;
an annular seal gland being defined by one of said relatively rotatable members and having at least one seal support surface;
an annular compression-type seal body having a seal circumference, a dynamic exclusionary intersection, and at least one seal end and being in compression between said relatively rotatable members and being located within said annular seal gland and serving as a partition between said first fluid and a second fluid, said at least one seal support surface supporting said annular compression-type seal body;
at least one annular sloping surface being defined by said annular compression-type seal body, said annular compression type seal body having varying depth, said at least one annular sloping surface being deformed by interference sealing engagement with said relatively rotatable sealing surface and defining a hydrodynamic wedging angle with respect to the relatively rotatable sealing surface and defining at least a portion of a dynamic sealing interface with said relatively rotatable sealing surface having an annular interfacial contact footprint with said relatively rotatable sealing surface, said annular interfacial contact footprint defining first and second footprint edges, said varying depth causing said annular interfacial contact footprint to vary in width and together with said hydrodynamic wedging angle defining a hydrodynamic geometry and hydrodynamically wedging a lubricating film of said first fluid into said dynamic sealing interface in response to relative rotational movement of said first fluid and said hydrodynamic geometry, causing the lubricating film to migrate from said fluid chamber into said dynamic sealing interface to said second footprint edge, and said dynamic exclusionary intersection being an intersection between said at least one annular sloping surface and said at least one seal end.

26. The annular hydrodynamic sealing assembly of claim 25, comprising:
said relatively rotatable sealing surface being an external cylindrical surface; and
said annular interfacial contact footprint being a cylindrical configuration resulting from deformation of said at least one annular sloping surface by said relatively rotatable sealing surface.

27. The annular hydrodynamic sealing assembly of claim 25, comprising:
deformation of said at least one annular sloping surface by said relatively rotatable sealing surface providing a gradual increase in interfacial contact pressure from said first footprint edge to said second footprint edge.

28. An annular hydrodynamic sealing assembly, comprising:
relatively rotatable members defining at least a portion of a fluid chamber containing a first fluid, one of said relatively rotatable members defining a relatively rotatable sealing surface;
an annular seal gland being defined by one of said relatively rotatable members and having at least one seal support surface;
an annular compression-type seal body having a seal circumference and first and second seal ends and being in compression between said relatively rotatable members and being located by said annular seal gland and sewing as a partition between said first fluid and a second fluid, said at least one seal support surface supporting said annular compression-type seal body; at least one annular sloping surface being defined by said annular compression-type seal body, said annular compression-type seal body having varying depth, said at least one annular sloping surface being deformed by interference sealing engagement with said relatively rotatable sealing surface defining a hydrodynamic wedging angle with respect to the relatively rotatable sealing surface and defining at least a portion of a dynamic sealing interface with said relatively rotatable sealing surface having an annular interfacial contact footprint with said relatively rotatable sealing surface, said annular interfacial contact footprint defining first and second footprint edges, said varying depth causing said annular interfacial contact footprint to vary in width, said first footprint edge together with said hydrodynamic wedging angle defining a hydrodynamic geometry and hydrodynamically wedging a lubricating film of said first fluid into said dynamic sealing interface in response to relative rotational movement of said first fluid and said hydrodynamic geometry, causing the lubricating film to migrate from said fluid chamber into said dynamic sealing interface to said second footprint edge;
said annular compression-type seal body defining a substantially circular exclusionary edge in the uncompressed condition thereof, said substantially circular exclusionary edge being located between said at least one annular sloping surface and said second seal end.

29. The annular hydrodynamic sealing assembly of claim 25, comprising:
said at least one annular sloping surface having a curvature that varies about at least part of said seal circumference.

30. An annular hydrodynamic sealing assembly, comprising:
relatively rotatable members defining at least a portion of a fluid chamber containing a first fluid, one of said relatively rotatable members defining a relatively rotatable sealing surface;
an annular seal gland being defined by one of said relatively rotatable members and having at least one seal support surface;
an annular compression-type seal body having a seal circumference and at least one seal end and being in compression between said relatively rotatable members and being located by said annular seal gland and serving as a partition between said first fluid and a second fluid, said at least one seal support surface supporting said annular compression-type seal body;
at least one annular sloping surface being defined by said annular compression-type seal body, said annular compression-type seal body having varying depth, said at least one annular sloping surface having curvature and defining at least a portion of a dynamic sealing surface, at least part of said at least one annular sloping surface being deformed by interference sealing engagement with said relatively rotatable sealing surface defining a hydrodynamic wedging angle with respect to the relatively rotatable sealing surface and defining at least a portion of a dynamic sealing interface with said relatively rotatable sealing surface having an annular interfacial contact footprint with said relatively rotatable sealing surface, said annular interfacial contact footprint defining first and second footprint edges and varying in width and together with said hydrodynamic wedging angle defining a hydrodynamic geometry and hydrodynamically wedging a lubricating film of said first fluid into said dynamic sealing interface in response to relative rotational movement of said first fluid and said hydrodynamic geometry, causing the lubricating film to migrate from said fluid chamber into said dynamic sealing interface to said second footprint edge;
a dynamic exclusionary intersection of abrupt form being established by an intersection between said dynamic sealing surface and said at least one seal end; and
said dynamic exclusionary intersection establishing said second footprint edge, said second footprint edge having substantially circular configuration.

31. The annular hydrodynamic sealing assembly of claim 25, comprising:
annular dynamic and static sealing lips being defined by said annular compression-type seal body and being oriented in generally opposed relation for minimizing compression-induced cross-sectional twisting of said annular compression-type seal body within said annular seal gland;

said at least one annular sloping surface being defined by said dynamic sealing lip.

32. The annular hydrodynamic sealing assembly of claim 31, comprising:

said at least one annular sloping surface being first and second annular sloping surfaces, said second annular sloping surface being a peripheral sealing surface of generally circular form defined by said static sealing lip.

33. The annular hydrodynamic sealing assembly of claim 25, comprising:

said annular compression-type seal body being formed of a sealing material having a first modulus of elasticity and having a dynamic sealing lip defining said at least one annular sloping surface; and an annular energizer element formed of a material having a second modulus of elasticity being different from said first modulus of elasticity and loading said at least one annular sloping surface of said dynamic sealing lip against said relatively rotatable sealing surface.

34. The annular hydrodynamic sealing assembly of claim 25, comprising:

said at least one seal end being curved outward in a generally convex configuration in the uncompressed configuration of said annular compression-type seal body; and when said annular compression-type seal body is placed in compression engagement with said relatively rotatable sealing surface said generally convex configuration being deformed to a configuration enhancing maintenance of contact pressure at said second footprint edge of said annular interfacial contact footprint.

35. The annular hydrodynamic sealing assembly of claim 25, comprising:

said annular compression-type seal body defining a dynamic control surface and a static control surface being disposed in generally opposed relation and establishing an annular seal body geometry having a ratio of length dimension divided by depth dimension being greater than 1.2 for resisting compression induced twisting of said annular compression-type seal body and maintaining predetermined interfacial contact pressure of said annular compression-type seal body with said relatively rotatable sealing surface at said second footprint edge and for resisting intrusion of said second fluid into said dynamic sealing interface.

36. An annular hydrodynamic seal for sealing between relatively rotatable members one of which defining a relatively rotatable sealing surface and serving as a partition between first and second fluids, comprising:

an annular seal body defining a circumference and first and second seal ends and having at least one annular sloping surface having varying slope;

varying about at least part of said circumference of said annular seal body;

at least a portion of said annular sloping surface being deformed by interference sealing engagement with the relatively rotatable sealing surface to define a hydrodynamic wedging angle with respect to the relatively rotatable sealing surface and to define a dynamic sealing interface having a generally circular interfacial contact footprint with the relatively rotatable sealing surface having first and second annular spaced footprint edges, said varying slope causing said first and second annular spaced footprint edges to vary in spacing about at least part of said circumference and establish a hydrodynamic geometry at said first footprint edge for hydrodynamically wedging a lubricating film of the first fluid into the dynamic sealing interface in response to relative rotational movement of the first fluid and said first footprint edge, causing the lubricating film to migrate within said dynamic sealing interface toward the second footprint edge; and a dynamic exclusionary intersection being located between said at least one annular sloping surface and said second seal end.

37. The annular hydrodynamic seal of claim 5, comprising:

said energizing element being an annular spring.

38. An annular hydrodynamic seal for interference sealing between a housing and a relatively rotatable surface and defining a sealed partition between a lubricant chamber of the housing and an environment, comprising:

an annular seal body having a seal circumference and at least one seal end;

an annular dynamic sealing surface being defined by said annular seal body and having varying slope about at least part of said seal circumference said varying slope defined by variable curvature, varying between a minimum curvature and a maximum curvature about at least part of said seal circumference;

a portion of said annular dynamic sealing surface being deformed by sealing contact with the relatively rotatable surface and defining an annular dynamic sealing interface with the relatively rotatable surface having first and second edges, said variable curvature causing said annular dynamic sealing interface to be of varying width about at least part of said seal circumference and;

a dynamic exclusionary intersection, being an intersection between said annular dynamic sealing surface and said at least one seal end.

39. A hydrodynamic sealing assembly, comprising:

a first machine component;

a second machine component being disposed in relatively rotatable relation with said first machine component and defining a relatively rotatable sealing surface;

first and second fluids being located between said first and second machine components;

an annular hydrodynamic seal composed of resilient sealing material establishing a partition between said first and second fluids and having an annular seal body defining first and second annular seal ends, said second annular seal end being of substantially convex configuration in the uncompressed state of said annular hydrodynamic seal and having static sealing relation with said first machine component and dynamic sealing relation with said relatively rotatable sealing surface, said second seal end having a dynamic sealing lip defining an annular angulated surface having a variable angle throughout its circumference and an annular curved surface having variable curvature throughout its circumference, said annular angulated surface and said annular curved surface in the non-compressed state thereof defining an annular sloping surface having annularly variable slope throughout its circumference and defining a dynamic exclusionary intersection with said second seal end, said annular sloping surface being deformed by said relatively rotatable sealing surface and defining a hydrodynamic wedging angle with respect to said relatively rotatable sealing surface and establishing a generally circular interfacial contact footprint with said relatively rotatable sealing surface having first and second footprint edges and varying in width, being wavy on said first footprint edge for hydrodynamically wedging a lubricating film of said first fluid into a dynamic sealing interface of the interfacial contact footprint with the relatively rotatable surface in response to relative rotational movement of said first fluid and said hydrodynamic geometry, causing the lubricating film to migrate within the dynamic sealing interface toward said second footprint edge, said second seal end having a static sealing lip being disposed in substantially opposed relation with said dynamic sealing lip and having static sealing engagement with said first machine component, said second annular seal end further defining an annular depth that varies circumferentially and results in variations in the magnitude and location of compression of said second annular end;

said second footprint edge being of substantially circular configuration established by compressed juncture between said at second annular seal end and the relatively rotatable sealing surface;

said second annular seal end defining an annular recess facing said second fluid; and an annular energizer being composed of a material having a different modulus of elasticity as compared with said resilient sealing material being located within said annular recess and loading said dynamic and static sealing lips for sealing with said first machine component and said second machine component.

40. The annular hydrodynamic sealing assembly of claim 24, comprising:

said exclusionary edge being substantially circular in the uncompressed condition of said annular resilient seal body.

41. An annular hydrodynamic seal for interference sealing between a housing and a relatively rotatable surface and defining a sealed partition between a lubricant chamber of the housing and an environment, comprising:

an annular seal body having a seal circumference and first and second ends and varying in depth about at least pad of said seal circumference, varying from a minimum depth to a maximum depth;

an annular dynamic sealing surface being defined by said annular seal body and having a variable curvature, varying between a minimum curvature and a maximum curvature about at least part of said seal circumference;

a portion of said annular dynamic sealing surface being deformed by sealing contact with the relatively rotatable surface and defining an annular dynamic sealing interface with the relatively rotatable surface being of varying width about at least part of said seal circumference; and a dynamic exclusionary intersection being established by intersection of said second seal end and said annular dynamic sealing surface.

\* \* \* \* \*